（12） United States Patent
Sakanishi et al.

(10) Patent No.: US 7,551,175 B2
(45) Date of Patent: Jun. 23, 2009

(54) IMAGE TRANSMISSION SYSTEM AND IMAGE TRANSMISSION METHOD

(75) Inventors: Yasuaki Sakanishi, Osaka (JP); Takashi Watanabe, Osaka (JP); Tsuyoshi Maeda, Hyogo (JP)

(73) Assignee: Panasonic Corporation, Osaka (JP)

( * ) Notice: Subject to any disclaimer, the term of this patent is extended or adjusted under 35 U.S.C. 154(b) by 253 days.

(21) Appl. No.: 10/583,994

(22) PCT Filed: Mar. 8, 2005

(86) PCT No.: PCT/JP2005/003987

§ 371 (c)(1),
(2), (4) Date: Jun. 22, 2006

(87) PCT Pub. No.: WO2005/088602

PCT Pub. Date: Sep. 22, 2005

(65) Prior Publication Data

US 2007/0257927 A1    Nov. 8, 2007

(30) Foreign Application Priority Data

Mar. 10, 2004    (JP)    ............................. 2004-068060

(51) Int. Cl.
*G06T 1/60* (2006.01)
(52) U.S. Cl. .................. 345/530; 345/550; 345/619
(58) Field of Classification Search .................. 245/530; 345/530
See application file for complete search history.

(56) References Cited

U.S. PATENT DOCUMENTS 3,944,351 A * 3/1976 Ito et al. ........................ 353/31
5,046,027 A * 9/1991 Taaffe et al. .................. 345/557
5,264,838 A * 11/1993 Johnson et al. .............. 345/611
5,414,811 A * 5/1995 Parulski et al. .............. 345/501

(Continued)

FOREIGN PATENT DOCUMENTS

EP    1178677    2/2002

(Continued)

OTHER PUBLICATIONS

Dayton et al, "Photoshop 5/5.5 Wow! Book", Copyright 2000, pp. 55-56 and 90-91.*

(Continued)

*Primary Examiner*—Kee M Tung
*Assistant Examiner*—Michelle K Lay
(74) *Attorney, Agent, or Firm*—Wenderoth, Lind & Ponack, L.L.P.

(57) ABSTRACT

An image transmission system which enables to perform various types of presentations and also to reduce a transmission path is provided. A PC includes a display image generation unit, a layer capture unit for sorting a layer composing a display image into a layer to be transmitted to a projector and a layer not to be transmitted, transmission layer adjustment unit for performing adjustment on the captured layer, and a PC communication unit for transmitting the adjusted layer to the projector, the projector includes a determines adjustment description put for a projector communication unit for receiving a transmission layer, an output layer adjustment unit for determining the content of the adjustment performed on the received layer and readjusting the received layer based on the judgment, and a display output unit for projecting the received layer onto a screen.

21 Claims, 19 Drawing Sheets

U.S. PATENT DOCUMENTS

| | | | |
|---|---|---|---|
| 5,833,338 A * | 11/1998 | Barak | 353/20 |
| 5,995,146 A * | 11/1999 | Rasmussen | 375/240.01 |
| 6,473,088 B1 * | 10/2002 | Matsumoto et al. | 345/530 |
| 2002/0047917 A1 | 4/2002 | Hirano | |
| 2002/0089518 A1 * | 7/2002 | Shigeta | 345/629 |
| 2002/0122075 A1 * | 9/2002 | Karasawa et al. | 345/846 |
| 2002/0186212 A1 | 12/2002 | Matsumoto et al. | |
| 2004/0013434 A1 * | 1/2004 | Hua | 398/106 |
| 2004/0051719 A1 * | 3/2004 | Fukui et al. | 345/660 |
| 2004/0130568 A1 | 7/2004 | Nagano et al. | |

FOREIGN PATENT DOCUMENTS

| | | |
|---|---|---|
| EP | 1244303 | 9/2002 |
| JP | 10-198326 | 7/1998 |
| JP | 2000-222164 | 8/2000 |
| JP | 2002-32069 | 1/2002 |
| JP | 2002/358065 | 12/2002 |
| JP | 2003-330436 | 11/2003 |

OTHER PUBLICATIONS

Miho Iio, Yoshihiro Koshikawa, *Multimedia Information Distribution / Display System; "Broad Messenger IV"*, Oki Technical Review, vol. 69, No. 3, Jul. 1, 2002, pp. 68-71.

European Search Report issued Apr. 4, 2008 in the corresponding European Application EP 5720259.

* cited by examiner

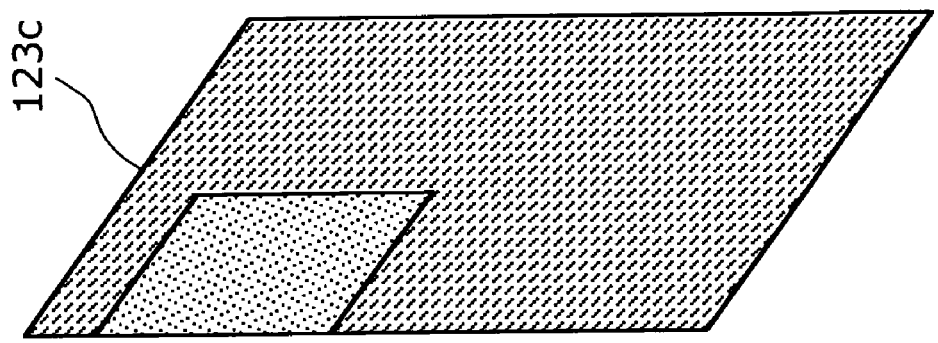
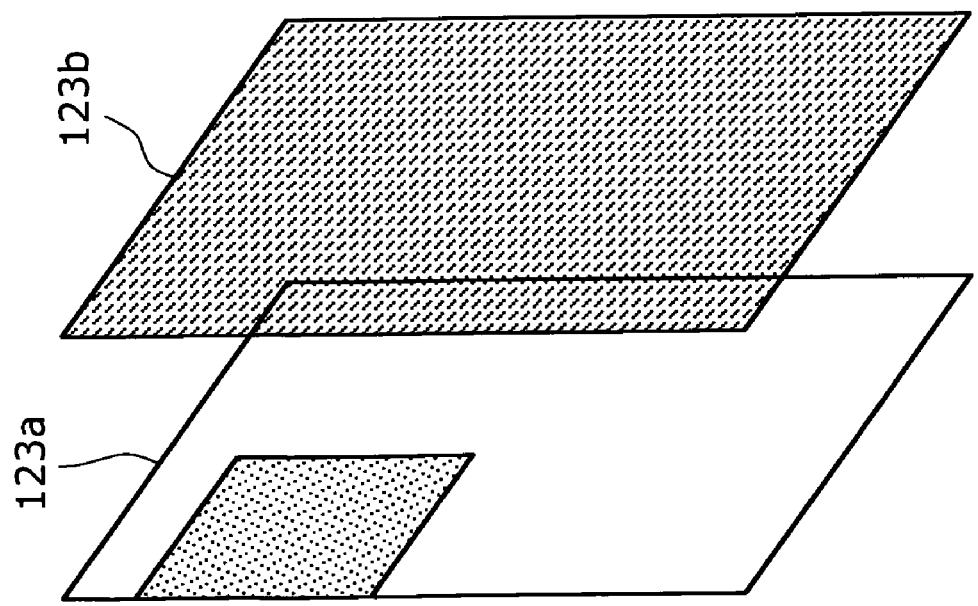

FIG. 8
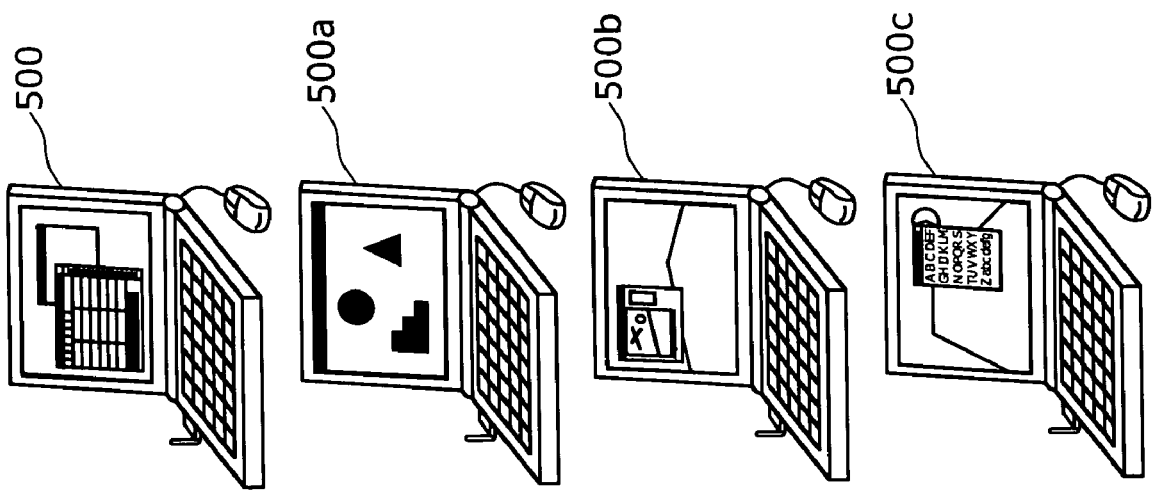
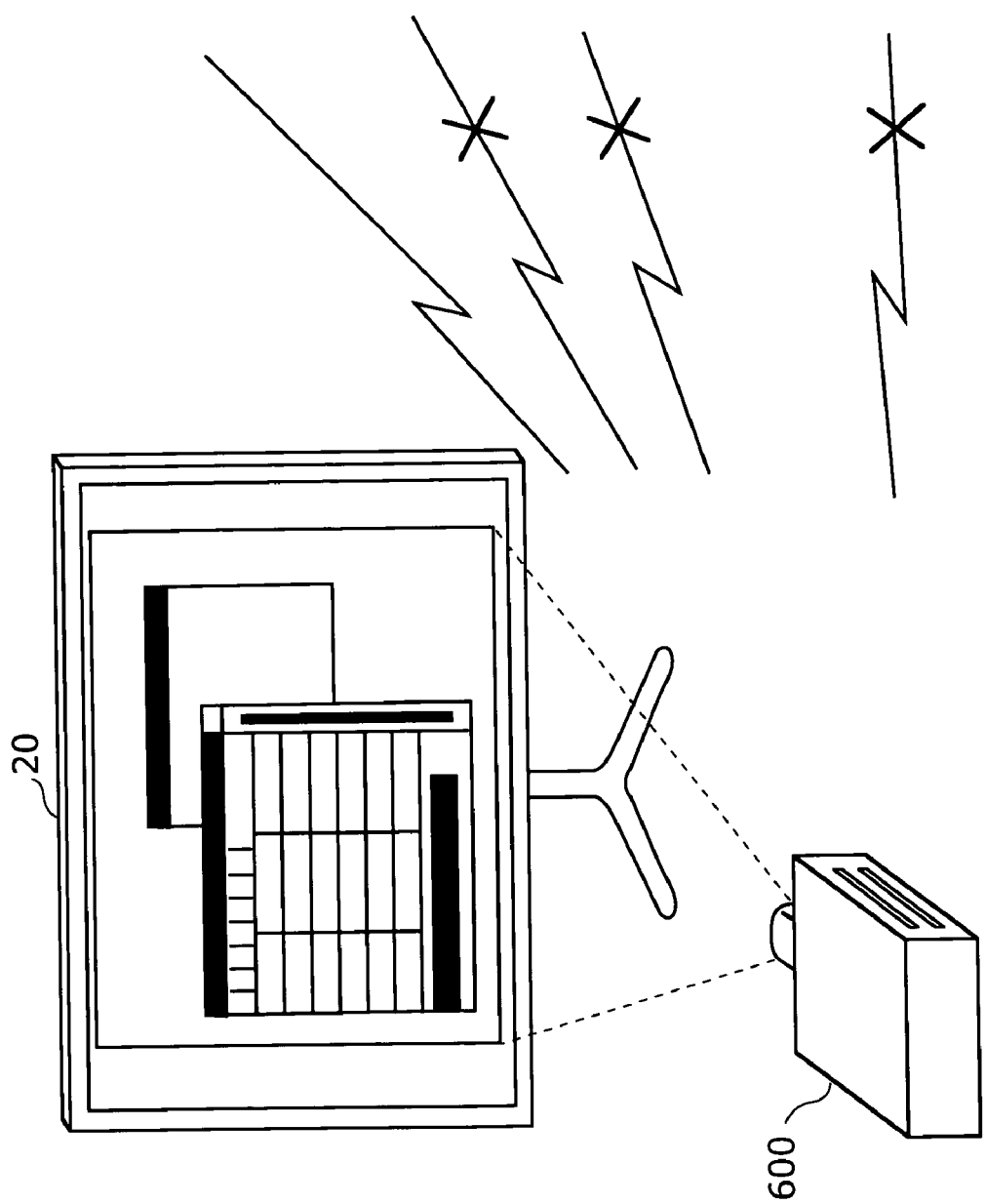

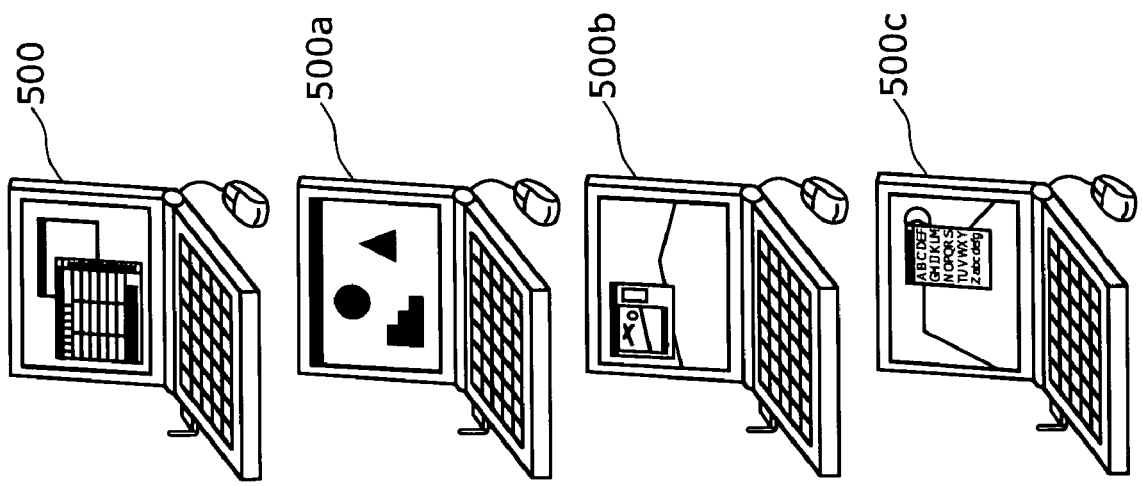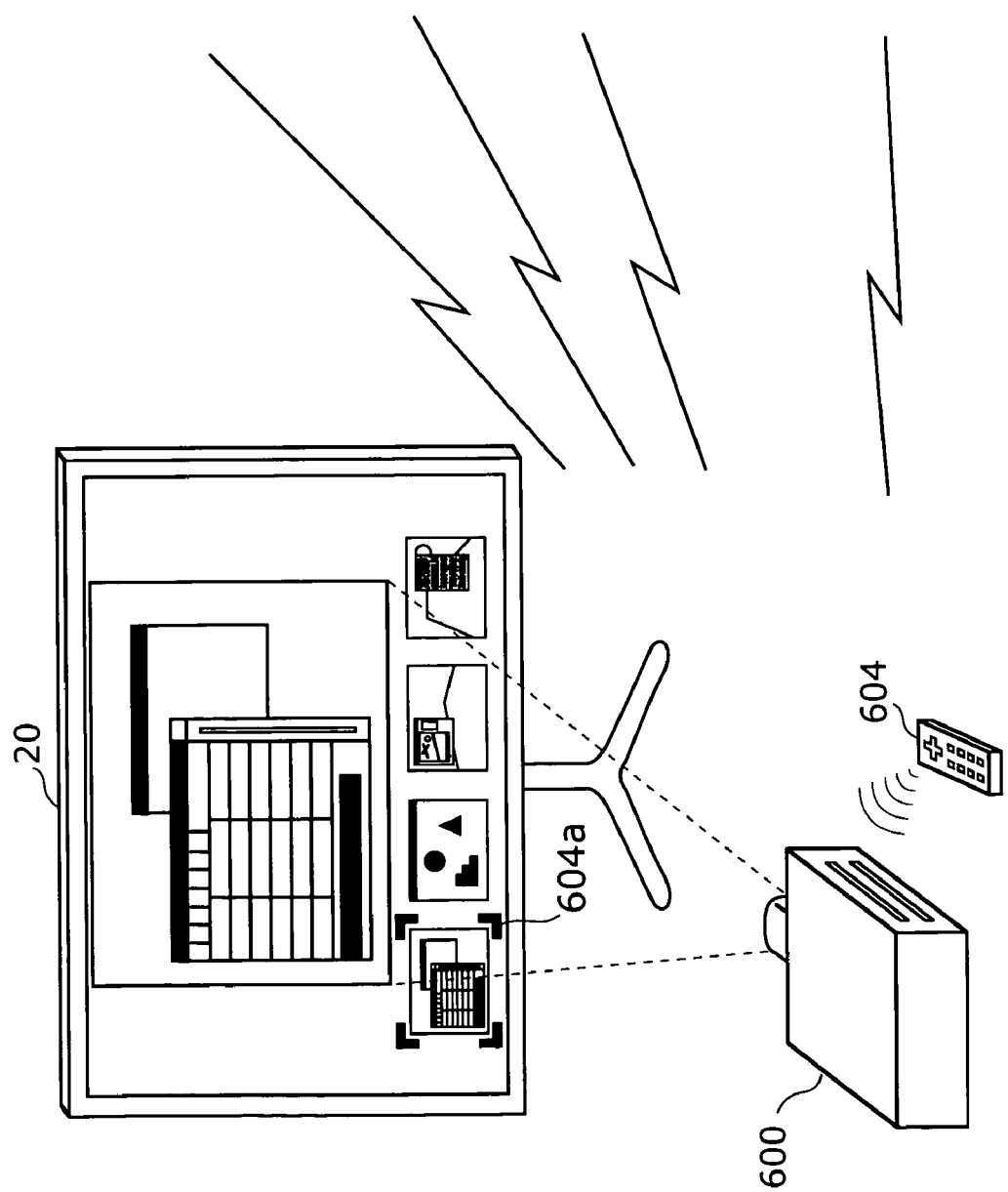
FIG. 9

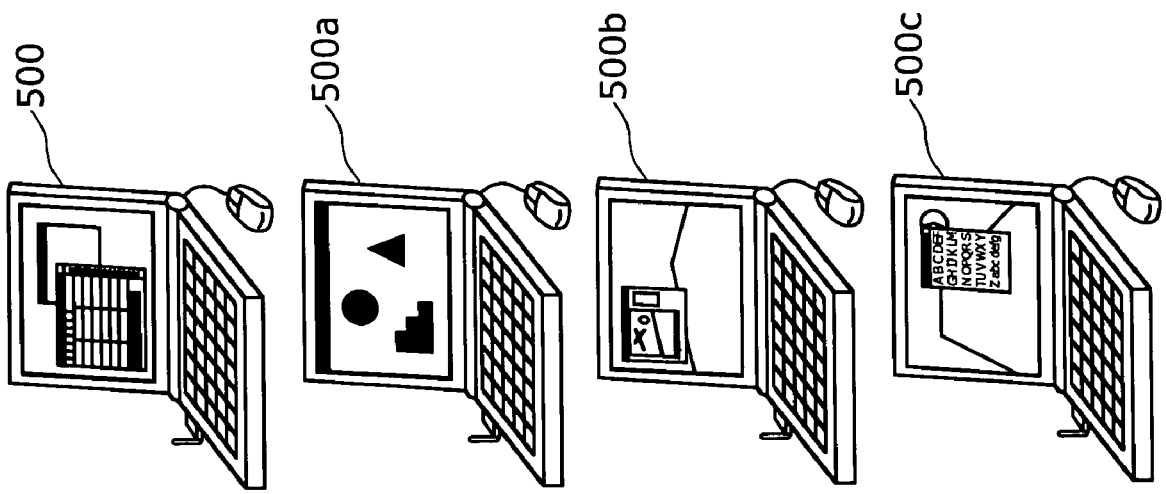
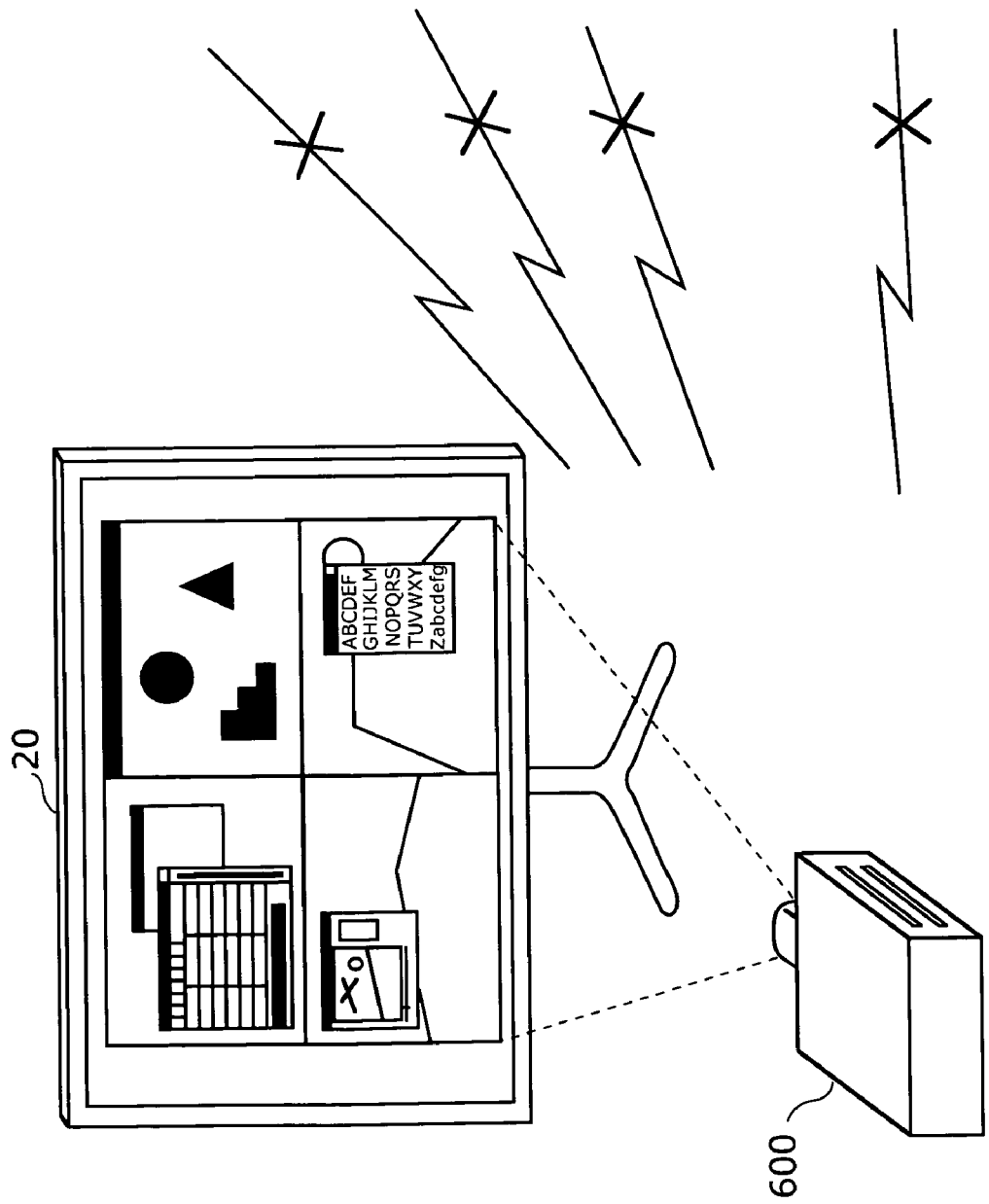
FIG. 10

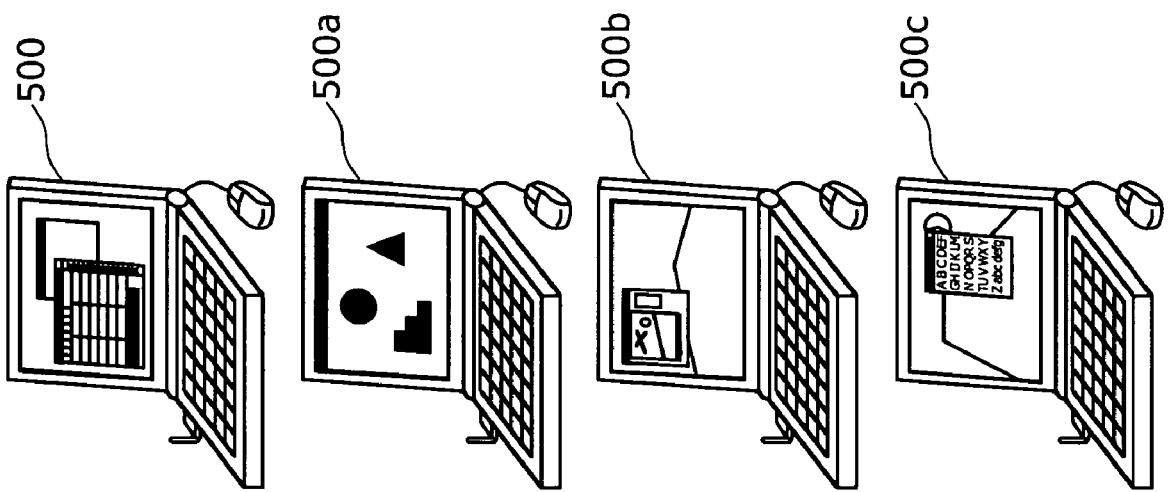
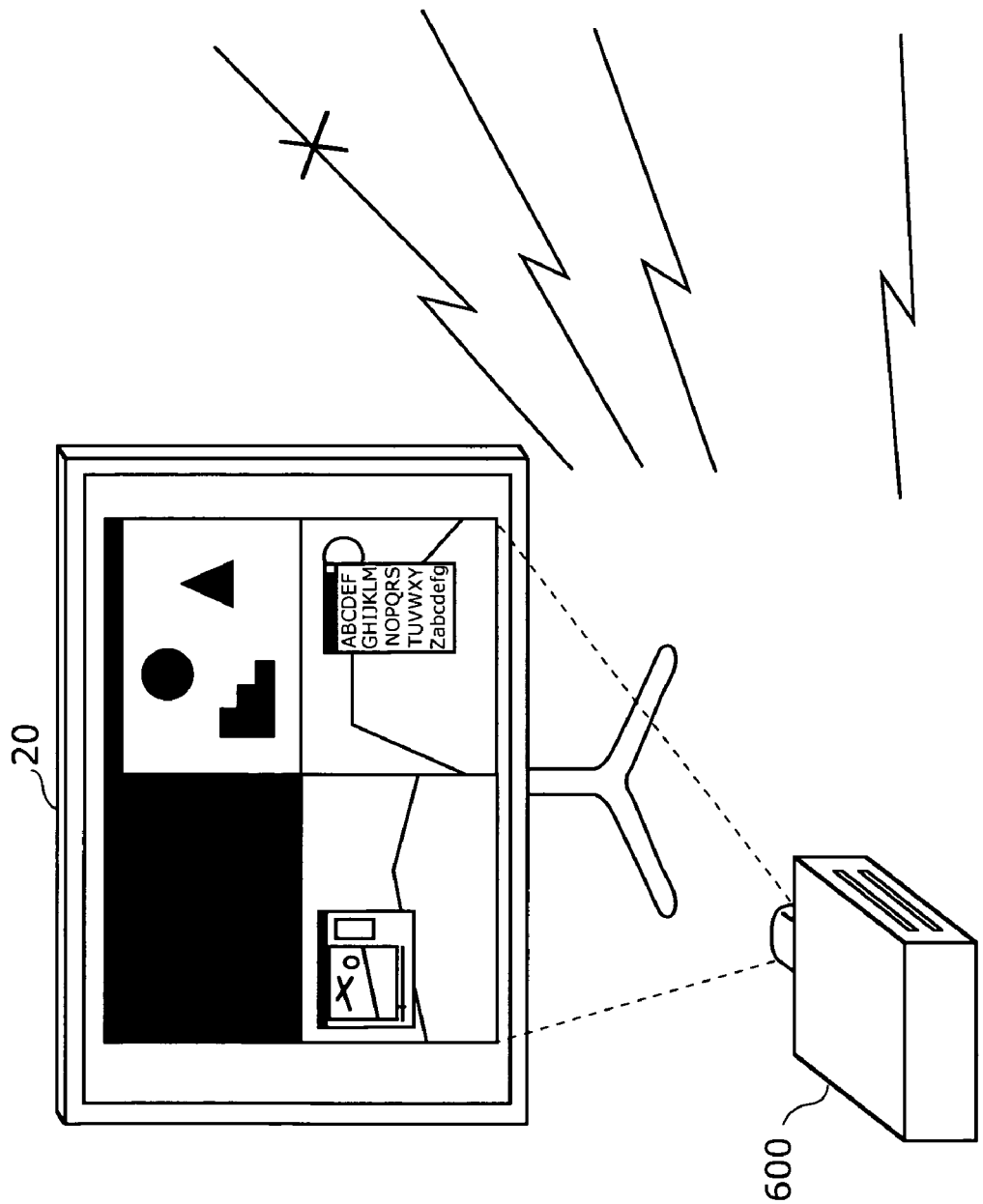
FIG. 11

IMAGE TRANSMISSION SYSTEM AND IMAGE TRANSMISSION METHOD

TECHNICAL FIELD

The present invention relates to an image transmission system and an image transmission method for transmitting an image from an image generating apparatus such as a personal computer (denoted as PC hereinafter) to an image projecting apparatus such as a projector.

BACKGROUND ART

A projector which receives an image signal from a PC and projects a PC display image onto a screen and the like has become popular in recent years. The projector is used for projecting a presentation document created by a PC onto a screen, so that it is possible to present the content of information visually, and such a projector is widely used on the occasions of conference, study meeting and so on.

The PC and the projector usually transmit and receive an image signal from each other by an analog connection through an RGB cable. However it is bothersome that a user needs to connect the PC and the projector each time. Moreover, in the case where, for example, the data to be projected is stored in plural PCs separately, the PC and the projector requires to be reconnected. In view of this, a wireless image transmission apparatus has been suggested as an alternative method to transmit an image signal from a PC to a projector by an infrared or a wireless LAN for the purpose of improvement in using the projector, and also a wireless transmission system to concurrently show image signals transmitted from plural PCs to one projector is also disclosed (for example refer to Patent Reference 1).

Patent Reference 1: Japanese Laid-Open Patent Application No. 2003-330436.

However, according to the above-mentioned wireless transmission system, the display area to be assigned to each PC is actually determined at the projector side. Therefore, there exists a problem in which various types of presentations cannot be performed by this system.

Moreover, according to the above-mentioned wireless transmission system, an image signal of a PC is transmitted to the projector directly. Therefore, there exists a problem that traffic in the transmission path is expanded. Particularly, the transmission rate for the major standard of the current wireless LAN (IEEE802.11b) is approximately 11 Mbps, while the transmission rate for the standard which is expected to be developed in the future (for example IEEE802.11 g) is approximately 54 Mbps. Therefore, it is desirable to reduce the traffic in the transmission path between a PC and a projector to the utmost extent.

In view of the above-mentioned problems, an object of the present invention is to provide an image transmission system which enables to perform various types of presentations and also to reduce the traffic in the transmission path at the same time.

SUMMARY OF THE INVENTION

In order to achieve the above-mentioned object, the image transmission system according to the present invention is characterized by including a plurality of image generating apparatuses, each of which generates an image; and an image projecting apparatus projects the plurality of images transmitted from the image generating apparatus through a multimode, in which the plurality of images are simultaneously projected onto a projection screen divided into a plurality of segments. The image generating apparatus includes: an image generating unit to generate an image; a transmission image adjustment unit to perform image adjustment on one of an image transmission and an image projection by the image projecting apparatus; and a transmission unit to transmit the adjusted image to the image projecting apparatus. The image projecting apparatus includes: a receiving unit to receive the image transmitted from the image generating apparatus; an output image adjustment unit to judge a content of the adjustment performed on the received image, and then to perform readjustment on the image based on the judgment; and a projecting unit to project the readjusted image. According to this, the transmission image is adjusted, in a PC side as the image generating apparatus for an image transmission to a projector as an image projecting apparatus and for a projection by the projector as the image projecting apparatus, and the adjusted images are transmitted to the projector, so that various types of presentations can be provided.

Here, the transmission image adjustment unit may perform image adjustment that corresponds to one of the multimode and a full-screen mode for projecting an image onto an entire projection screen of the image projecting apparatus. According to this, a user is able to project a PC display image onto the projector screen changing from the multimode to a full-screen mode or vice versa.

In addition, the output image adjustment unit may perform readjustment by prioritizing the images in other image generating apparatuses, which is received later by the receiving unit, in the case where the image is performed the readjustment in the multimode. In addition, the output image adjustment unit may perform readjustment by prioritizing the images on which readjustment is performed currently, and not to perform readjustment on the images in other image generating apparatuses received later by the receiving unit, in the case where the image is performed the readjustment in the full-screen mode. According to this, the user is able to project the PC display image in the multimode later. In the case of the full-screen mode, the later use is not able to project the PC display image onto the projection screen, so that the user performing projection in full-screen mode is able to occupy the projector, and to project the PC display image.

In addition, the output image adjustment unit may perform readjustment on the received image using an index mode for projecting simultaneously the plurality of images onto the projection screen by dividing the projection screen into a main area and a plurality of sub-areas. Here, it is preferable that the image projecting apparatus further includes: a selection acceptance unit to accept a selection of an image out of the plurality of images respectively projected onto the plurality of sub-areas, and the output image adjustment unit to perform readjustment the selected image, and then to project the selected image onto the main area. According to this, the user is able to select one image out of the plurality of images and then to project the image onto the main area of the projector.

More particularly, the transmission image adjustment unit adds information, to the image, which specify a position on the projection screen of the image projecting apparatus, and the output image adjustment unit judges the specified position, and places the image on the position on the projection screen. According to this, the user is able to project an image onto a specified area on the projection screen of the projector.

In addition, the transmission image adjustment unit performs image adjustment on the image so as to fit to the size on the projection screen of the image projecting apparatus. According to this, the transmission image is adjusted beforehand to the size of the image to be projected onto the projection screen at PC side, so that the traffic in a transmission path can be reduced.

In addition, the transmission image adjustment unit performs an adjustment of a resolution for the image. According to this, the resolution of the transmission image at PC side is adjusted in accordance with the resolution of the projector, so that the amount of the transmission between the PC and the projector can be reduced.

In addition, the transmission image adjustment unit sets an area, in the image, to be transmitted to the image projecting apparatus. According to this, only an area which has been set in a PC display is transmitted to the projector, so that the user is able to project only the area where the user indicates.

In addition, the transmission image adjustment unit performs image adjustment on a compression degree of the image, compresses the image and adds information related to the compression to the compressed image, and the output image adjustment unit judges the information related to the compression and decompresses the received image. According to this, the PC adjusts the degree of compression of the display image and transmits the adjusted display image, so that the transmission of the display image based on the users setting of the video quality as a priority, and setting of transmission speed as a priority and the like can be performed.

In addition, the transmission image adjustment unit sets an authorization related to an occupancy on the projection screen of the image projecting apparatus, and adds the information related to the authorization to the image, and the output image adjustment unit judges whether or not the received image is allowed to be projected based on the information related to the authorization. According to this, the projection by the projector is allowed, or is prohibited based on the per-user authorization concerning to the projector's display. Therefore, a various types of presentation can be implemented, for example when a teacher is projecting a display image on a projector, students are prohibited to send display images to the teacher's projecting area.

In addition, the transmission image adjustment unit predicts a display image to be projected on the image projecting apparatus, and corrects the image based on the prediction. According to this, the projecting status of the projector is predicted and the transmission display image is corrected beforehand, so that the time required for the adjustment of the projecting status by operating projector can be reduced.

Furthermore, the image transmission system of the present invention may include a remote controller to operate the image projecting apparatus. The remote controller includes: an operation input unit to accept an operation of the image projecting apparatus by a user; and an emulation mode setting unit to virtually set an input by the operation input unit to an input mode by an input unit of the image generating apparatus. The image projecting apparatus includes: a remote controller code receiving unit to obtain an operation signal inputted in the operation input unit; and a signal transmission unit to transmit the obtained operation signal to the image generating apparatus. The image generating apparatus includes: a signal receiving unit to receive the operation signal; and a key emulation unit to convert the received operation signal into an input by the input unit of the image generating apparatus. According to this, the operation of the remote controller of the projector is emulated by the operation of the input unit in the PC, so that the user is able to execute operations such as the page forward/backward by a remote controller of a projector when the user steps away from the PC.

It should be noted that the present invention can be realized not only as such image transmission system, but also as an image transmission method implementing the distinctive methods included as steps in the respective apparatuses composing such image transmission system, and also as a program directing a computer to execute these steps. Furthermore, such program can obviously be distributed through transmission media such as storage media (for example CD-ROM) and Internet.

According to an image transmission system of the present invention, a display position, an area to which a display image is transmitted and the like are adjusted in a PC and then the display image is transmitted from the PC to a projector. Therefore, it is possible for a user to select a full-screen display, a two divided-screen display or a four divided-screen display for projecting a PC display image onto the projector screen. Moreover, it is possible to select an area to be transmitted to the projector and to project a display image in the selected area onto the projector screen, and thus the various types of presentations can be implemented. In addition, the size of the display image to be transmitted is adjusted, in the PC, to the display size to be projected onto the projector screen, and then the adjusted display image is transmitted to the projector, so that the transmission load can be reduced.

In addition, the resolution of the display image to be transmitted is adjusted in the PC in accordance with the resolution that the projector can support, and then the adjusted display image is transmitted to the projector, so that the amount of the transmission between the PC and the projector can be reduced.

Furthermore, a compression degree of the display image is adjusted and then the adjusted display image is transmitted to the projector, so that it is possible to transmit the display image in accordance with the user setting such as picture quality priority, transmission speed priority and the like.

BRIEF DESCRIPTION OF DRAWINGS

FIG. 4A is a drawing showing a structure of separated layers, and FIG. 4B is a drawing showing a structure of layers to be displayed actually.

FIG. 8 is a diagram showing a situation that a PC display image is projected onto a screen of a projector using the entire screen.

FIG. 9 is a diagram showing a situation that an enlarged PC display image is projected onto a screen of a projector.

FIG. 10 is a diagram showing a situation that a display mode of a projector is changed from a full-screen display to a multi-screen display.

FIG. 11 is a diagram showing a situation that communications between a projector and PCs are re-established, so that the display is changed to a multi-screen display.

NUMERICAL REFERENCES

10 Wireless LAN card

Figure 1:
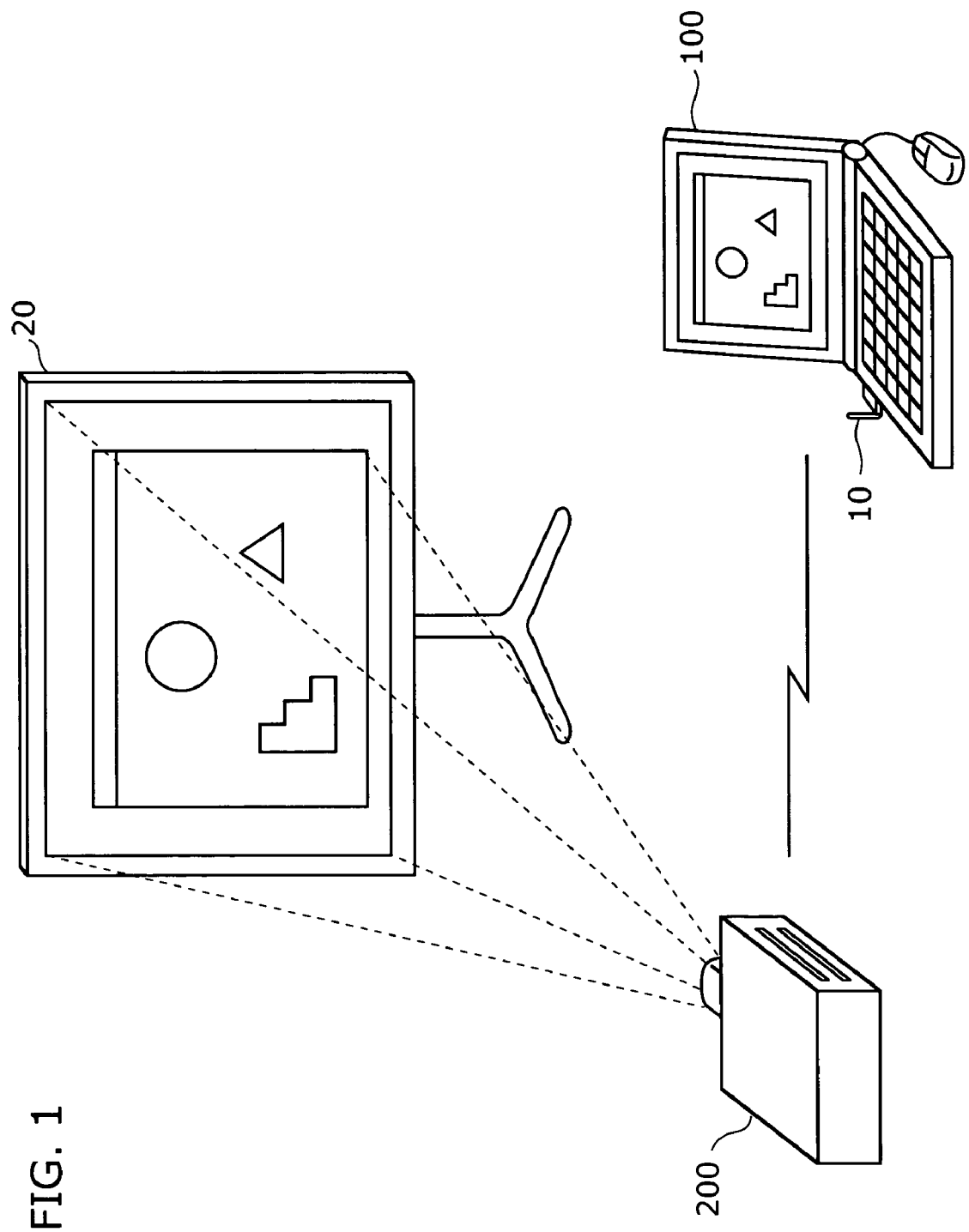
FIG. 1 is a drawing showing an external view of an image transmission system for an embodiment of the present invention.

20 Screen 100, 500, 500a, 500b, 500c and 560 PC 101 and 201 CPU 102 and 202 Main memory 103 and 203 Storage unit 104 and 204 Graphics chip 105 and 206 VRAM 106 Output IF 107 User IF 108 and 207 Network IF 110 Display 111 Keyboard 112 Mouse 123a Upper layer 123b Lower layer 123c Display layer 200, 600, 600a and 600b Projector 205 Resizing LSI 208 Output unit 501 Control unit 502 Display image generation unit 503 Layer capture unit 504 and 562 PC communication unit 505 and 602 Display output unit 506 Input unit 507 Transmission layer adjustment unit 511 Offset adjustment unit 512 Resolution adjustment unit 513 Area adjustment unit 514 Compression adjustment unit 515 User authorization setting unit 516 Display image correction unit 520b and 520c Setting area 530b Determined area 540 and 551 PC display image 541 User name indication 552 and 553 Display image after correction 554 Pre-correction display image 561 Key emulation unit 601 and 632 Projector communication unit 603 Output layer adjustment unit 604 and 640 Remote controller 604a Selection cursor 611 Offset judgment unit 612 Resolution judgment unit 613 Area judgment unit 614 Compression judgment unit 615 User authorization judgment unit 616 Correction judgment unit 620 Image extract unit 621 Writing unit 622 Print output unit 631 Remote controller code receiving unit 641 Operation input unit 642 Emulation mode setting unit

DETAILED DESCRIPTION OF THE INVENTION

Hereafter, the best mode for carrying out the present invention is explained in detail.

FIG. 1 is a drawing showing an external view of an image transmission system for an embodiment of the present invention.

The image transmission system transmits an image displayed on a PC 100 from the PC 100 to a projector 200, and then the received display image is projected onto a screen 20 by the projector 200. The PC 100 is equipped with a wireless LAN card 10 storing a wireless LAN chip so as to transmit an image signal to the projector 200 through a network.

Figure 2:
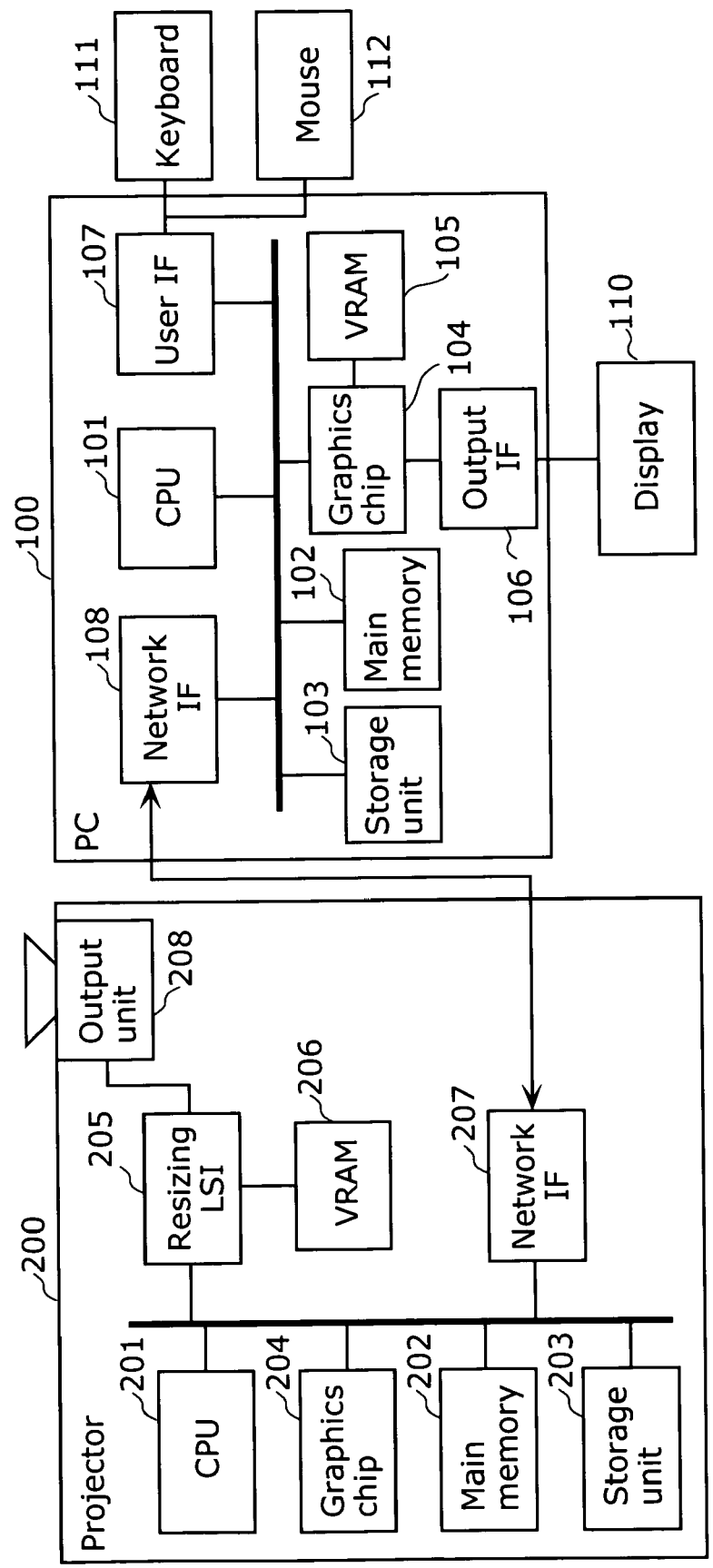
FIG. 2 is a block diagram showing a hardware configuration of a PC and a projector in the image transmission system.

FIG. 2 is a block diagram showing a hardware configuration of the PC 100 and the projector 200 included in the image transmission system for the present embodiment.

As shown in FIG. 2, the PC 100 has a CPU 101, a main memory 102, a storage unit 103, a graphics chip 104, a VRAM 105, an output IF 106 to output onto a display 110, a user IF 107 to obtain an instruction signal based on a user's operation from an input unit such as a keyboard 111 and a mouse 112, and a network IF 108 which is an interface to communicate with the projector 200, a server and so on through a LAN and the like.

The projector 200 has a CPU 201, a main memory 202, a storage unit 203, a graphics chip 204, a resizing LSI 205, a VRAM 206, a network IF 207 and an output unit 208.

Figure 3:
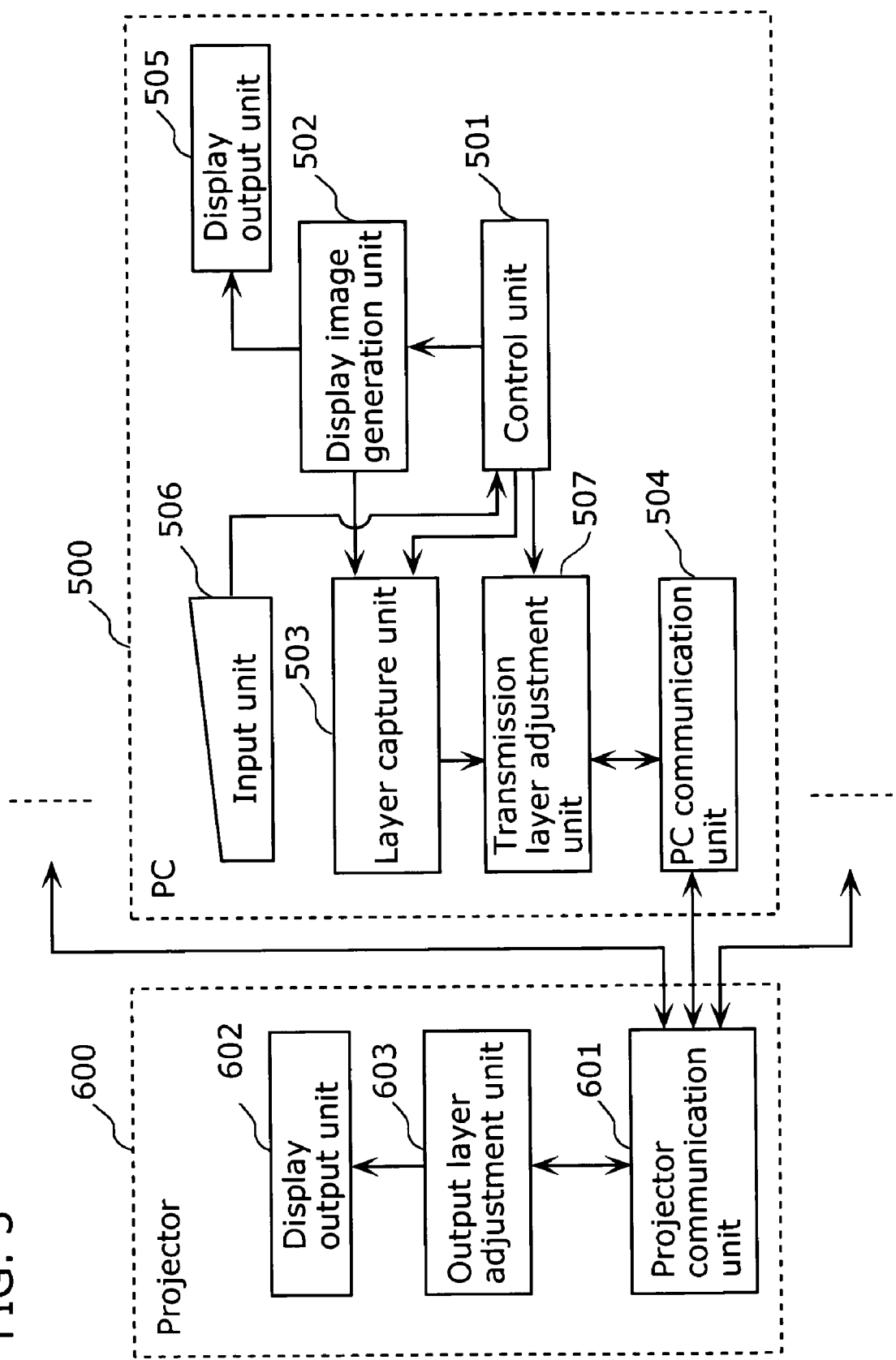
FIG. 3 is a block diagram showing a functional configuration of the PC and the projector in the image transmission system.

FIG. 3 is a block diagram showing a functional configuration of the PC and the projector in the image transmission system for the present embodiment.

As shown in FIG. 3, a PC 500 has a control unit 501, a display image generation unit 502, a layer capture unit 503, a PC communication unit 504, a display output unit 505, an input unit 506 and a transmission layer adjustment unit 507, and a projector 600 has a projector communication unit 601, a display output unit 602 and an output layer adjustment unit 603.

The control unit 501 is a processing unit to control each unit in the PC 500, and the control unit 501 is realized as the CPU 101 and the main memory 102. For example, the control unit 501 outputs a directive of display image generation to the display image generation unit 502, and also outputs a directive of a capture of a layer which is a composing unit of a display to the layer capture unit 503.

The display image generation unit 502 is a processing unit to obtain a directive of display image generation from the control unit 501, and to generate a display image to be outputted to a display unit such as a display screen. The display image generation unit is realized as the graphics chip 104, the VRAM 105 and the like.

The layer capture unit 503 is a processing unit to obtain a directive of a capturing from the control unit 501, and to capture, for every layer, the display image which has been generated by the display image generation unit 502, and the layer capture unit 503 is realized as the graphics chip 104, the main memory 102 and the like. In addition, the layer capture unit 503 outputs the captured display image to the transmission layer adjustment unit 507. Here, the directive of the capturing outputted from the control unit 501 includes the layer information to be captured only, and does not include the layer information not to be captured. It should be noted that the control unit 501 judges whether or not a layer is captured based on a presetting in a software program or based on a user setting of the PC 500. Here, the structure of the layer is explained referring to FIG. 4.

FIG. 4A is a drawing showing a structure of the separated layers, and an upper layer 123a and a lower layer 123b are shown. Here, the upper layer 123a is a layer to be displayed at a frontmost position, and the lower layer 123b is a layer to be displayed at a posterior position in a display.

FIG. 4B is a drawing showing a structure of the layers to be displayed actually. A display layer 123c composing a display is shown. The display layer 123c is a layer composed by superimposing the upper layer 123a on the lower layer 123b. As thus described, the display image displayed on the display 110 of the PC 100 is composed by a laminated plurality of layers.

The transmission layer adjustment unit 507 is a processing unit to perform adjustment on settings of the layer captured by the layer capture unit 503 such as a setting for the time of transmission to the projector 600 and a setting for the display in the projector 600, and the transmission layer adjustment unit 507 is realized as the CPU 101, the main memory 102 and the like. Subsequently, the transmission layer adjustment unit 507 outputs the adjusted layer, as a display image to be transmitted to the projector 600, to the PC communication unit 504. Note that the transmission layer adjustment unit 507 is explained in detail hereafter.

The PC communication unit 504 is a processing unit to obtain a transmission display image from the transmission layer adjustment unit 507, to packetize the obtained transmission display image and then to transmit the packetized transmission display image to the projector 600, and the PC communication unit 504 is realized as the CPU 101, the network IF 108 and the like.

The display output unit 505 is a processing unit to obtain the outputted display image generated by the display image generation unit 502, and to output the obtained display image to the display unit, and the display output unit 505 is realized as the output IF 106.

The projector communication unit 601 is a processing unit to receive the packetized transmission display image from the PC communication unit 504 and then to output the received packetized transmission display image to the output layer adjustment unit 603, and the projector communication unit 601 is realized as the CPU 201, the network IF 207 and the like.

The output layer adjustment unit 603 is a processing unit to judge the content of the adjustment performed by the transmission layer adjustment unit 507, to perform readjustment on the received layer and then to transmit the readjusted layer to the display output unit 602, and the output layer adjustment unit 603 is realized as the CPU 201, the main memory 202 and the like. Note that the output layer adjustment unit 603 is explained in detail hereafter.

The display output unit 602 is a processing unit to obtain the projecting display image from the output layer adjustment unit 603, and output the display image on the screen, and the display output unit 602 is realized as the output device 208 and the like.

Figure 5A:
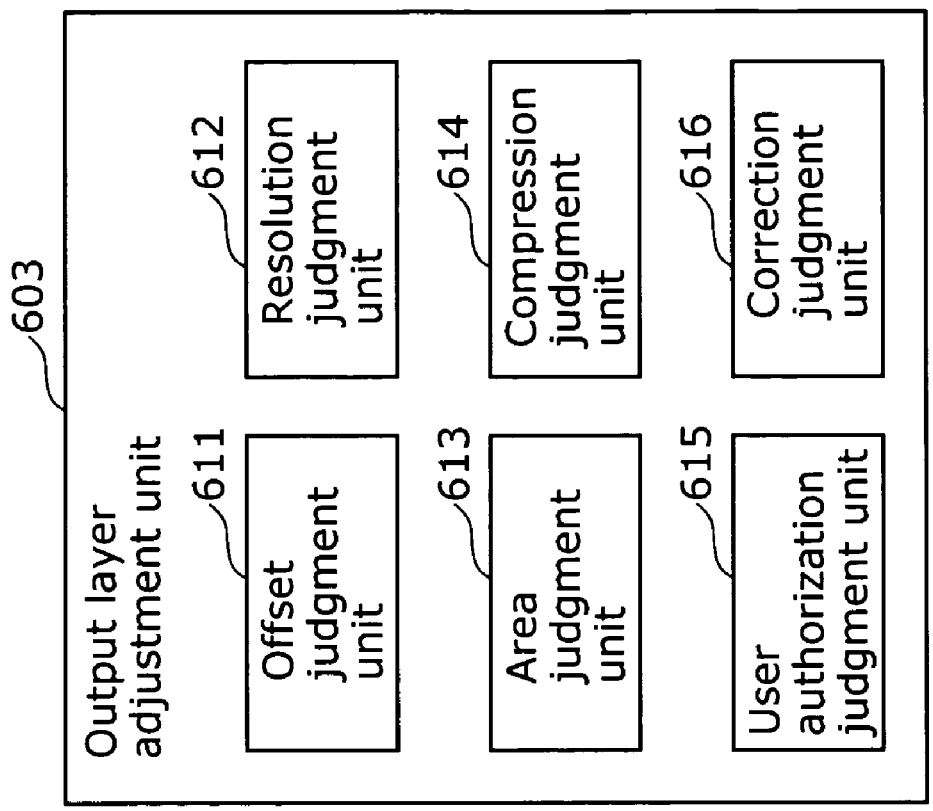
FIG. 5A is a detailed functional block diagram of a transmission layer adjustment unit.

FIG. 5A is a detailed functional block diagram of the transmission layer adjustment unit 507.

As shown in FIG. 5A, the transmission layer adjustment unit 507 includes an offset adjustment unit 511, a resolution adjustment unit 512, an area adjustment unit 513, a compression adjustment unit 514, a user authorization setting unit 515 and a display image correction unit 516.

The offset adjustment unit 511 is a processing unit to perform adjustment on a display position (an offset) in the projector 600. For example, the offset adjustment unit 511 accepts a specification of the display position through the input unit 506 by the user, and then outputs, to the PC communication unit 504, the information on the display position with the layer to be transmitted. In addition, the offset adjustment unit 511 performs adjustment on a display size as well as an offset in the projector 600. Here, an adjustment of a display image size means that, for example, a PC display image is reduced to ¼ size of a display screen of the projector 600. The offset adjustment unit 511 obtains, from the projector 600, and stores the information on the size of the display screen of the projector 600 in advance, so that it is possible to adjust the PC display image so as to fit to the display size of the projector.

The resolution adjustment unit 512 is a processing unit to perform adjustment on a resolution of the transmission display image. The resolution adjustment unit 512, for example, obtains information on the maximum resolution of the projector 600 from the projector 600 in advance. In the case where the resolution of the transmission display image of the PC 500 is greater than the maximum resolution, the resolution adjustment unit 512 lowers the resolution of the transmission display image and outputs the transmission display image to the PC communication unit 504.

The area adjustment unit 513 is a processing unit to perform adjustment on an area to be transmitted from among the captured layers. The area adjustment unit 513, for example, accepts a specification of an area through the input unit 506 by the user, and then outputs the specified area as a transmission layer to the PC communication unit 504.

The compression adjustment unit 514 is a processing unit to perform adjustment on a degree of compression of a layer to be transmitted by changing the compression ratio and the compression technology. The compression adjustment unit 514, for example, accepts a specification of such as compression ratio by the user through the input unit 506, compresses the transmission layer using the specified compression ratio and the like, and then outputs the compressed transmission layer to the PC communication unit 504. The compression adjustment unit 514 performs adjustment on the degree of compression, so that it is possible to selectively set by the user whether the video quality at the time of a projection on the projector is prioritized or the communication speed at the time of a transmission to the projector is prioritized. It should be noted that the degree of the compression is adjusted by changing the quantization range and the skipping ratio.

The user authorization setting unit 515 is a processing unit to add, to a transmission display image, information relating to a user authorization. Here, the user authorization means a display authorization on the projector 600. For example, in the case where a master authorization is added to a transmission display image, it is possible not to be interrupted by a transmission display image added a general user authorization (in fact the display is not disturbed).

The display image correction unit 516 is a processing unit to correct a transmission display image, so as to be displayed onto the screen of the projector 600 appropriately. The display image correction unit 516 obtains, from the projector 600, the information related to the projected display (display prediction information) in advance, performs, based on the obtained information, a keystone correction and the like on the transmission display image so as to be displayed appropriately onto the screen of the projector 600, and then outputs the corrected transmission display image with the information related to the correction.

Figure 5B:
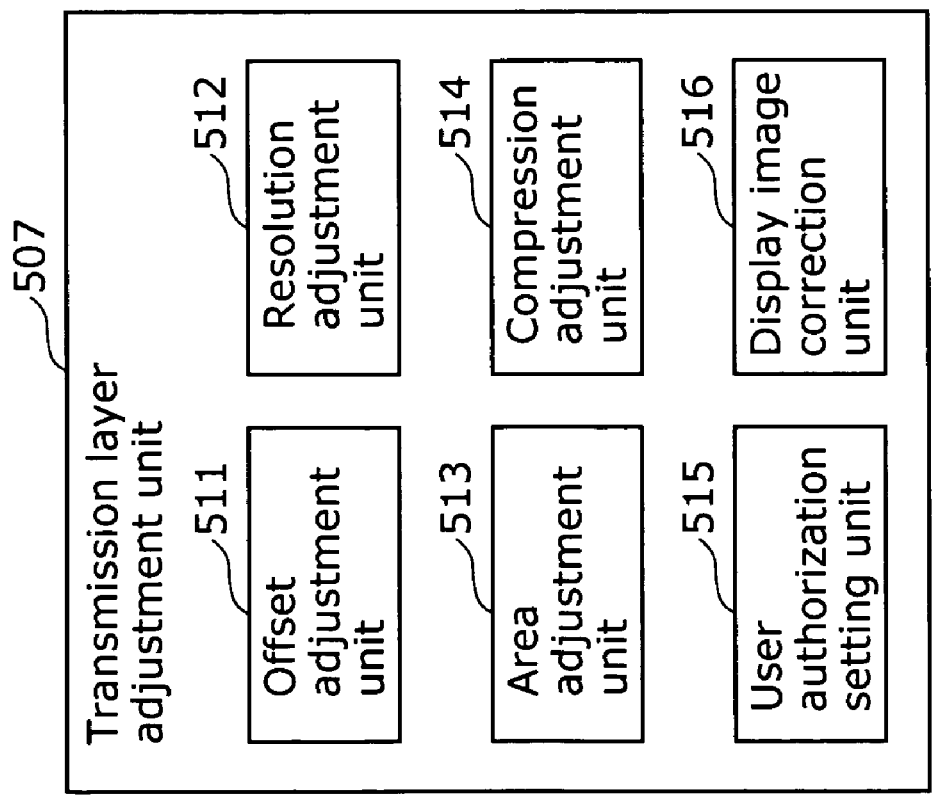
FIG. 5B is a detailed functional block diagram of an output layer adjustment unit.

In addition, FIG. 5B is a detailed functional block diagram of the output layer adjustment unit 603.

As shown in FIG. 5B, the output layer adjustment unit 603 includes an offset judgment unit 611, a resolution judgment unit 612, an area judgment unit 613, a compression judgment unit 614, a user authorization judgment unit 615 and a correction judgment unit 616, and these units correspond to the respective units in the configuration of the transmission layer adjustment unit 507.

The offset judgment unit 611 is a processing unit to judge a display position information set in the offset adjustment unit 511, and place the PC display image on the display position.

The resolution judgment unit 612 is a processing unit to judge the resolution of the transmission display image of the PC 500, confirm that the resolution is not greater than the maximum resolution of the projector 600, and then transmit the transmission display image to the display output unit 602. It should be noted that in the case where the resolution of the transmission display image of the PC 500 is lower than the maximum resolution of the projector 600, the resolution of the transmission display image may be increased to the maximum resolution of the projector 600, and then the transmission display image may be transmitted to the display output unit 602.

The area judgment unit 613 is a processing unit to judge the area specified by the area adjustment unit 513, and transmit the area to the display output unit 602.

The compression judgment unit 614 is a processing unit to judge the compression ratio and the like set in the compression adjustment unit 514, uncompress the compressed transmission display image, and transmit to the display output unit 602.

The user authorization judgment unit 615 is a processing unit to judge the user authorization information added to the transmission display image, and control the output of the transmission display image to the display output unit 602 depending on the user authorization. In fact, in the case of the aforesaid example, the user authorization judgment unit 615 controls to output, directly to the display output unit 602, the transmission display image to which a master authorization is added. The user authorization judgment unit 615 also controls not to output the transmission display image, to the display output unit 602, to which a general user authorization is added, in the case where the transmission display image with a master authorization is shown on the screen.

The correction judgment unit 616 is a processing unit to generate display prediction information using an angle sensor and the like equipped in the projector 600 so as to transmit the generated information to the PC 500 through the projector communication unit 601. In addition, the correction judgment unit 616 judges the correction information performed in the display image correction unit 516 so as to transmit the information to the display output unit 602. In the case where the correction information is not included in the transmission display image, the correction judgment unit 616 may perform, based on the display prediction information, a keystone correction and the like on the transmission display image so as to be displayed appropriately, and then transmit the corrected transmission display image to the display output unit 602.

Figure 6:
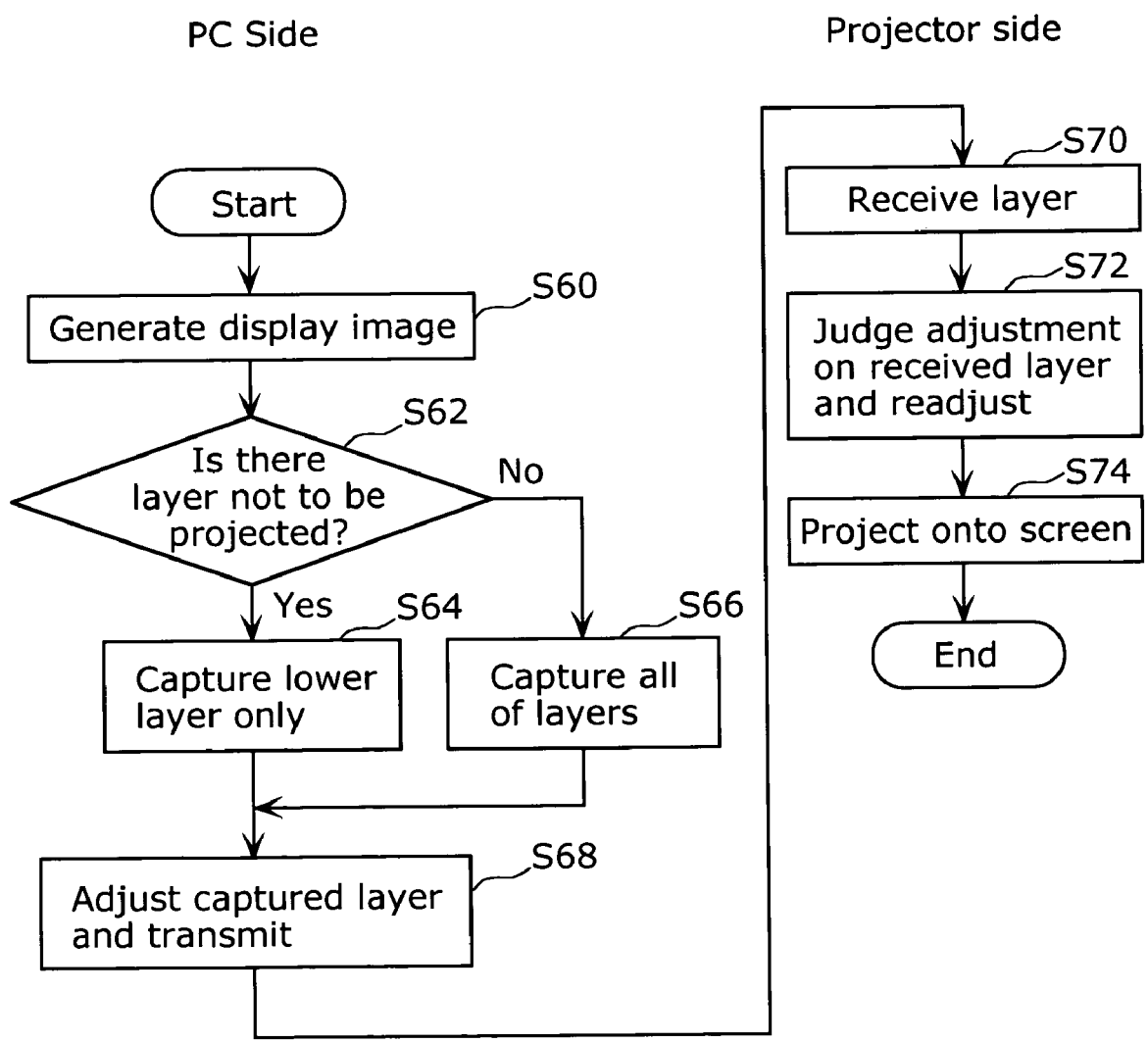
FIG. 6 is a flowchart showing a process sequence of the PC and the projector.

The processing operation for the image transmission system configured as mentioned above is explained hereafter. FIG. 6 is a flowchart showing a process sequence of the image transmission system.

Firstly, the PC 500 generates a display image in the display image generation unit 502 (S60).

Secondly, the control unit 501 judges whether or not there exists a layer not to be projected onto the screen of the projector 600 (S62). In the case where there exists the layer not to be projected (Yes of S62), the control unit 501 outputs, to the layer capture unit 503, a directive of capturing the layer (the lower layer) to be projected, and the layer capture unit 503 captures only the lower layer based on the directive (S64). In the case where there does not exist a layer not to be projected (No of S62), the control unit 501 outputs, to the layer capture unit 503, a directive of capturing all of the layers, and the layer capture unit 503 captures all of the layers based on the directive (S66).

Afterwards, the layer capture unit 503 outputs the captured layers to the transmission layer adjustment unit 507. The transmission layer adjustment unit 507 performs the aforesaid various adjustments to the captured layers, and then outputs the adjusted layers to the PC communication unit 504. The PC communication unit 504 packetizes the obtained layers and additional information added in the transmission layer adjustment unit 507 to the layer, and then transmits to the projector 600 (S68).

On the other hand, in the projector 600, in the case where the projector communication unit 601 receives the layer transmitted from the PC 500 (S70), the output layer adjustment unit 603 judges the adjustment performed on the received layers, performs the aforesaid various adjustments again, and then outputs to the output display unit 602 (S72).

Finally, the output display unit 602 obtains the readjusted layers, projects the obtained layers onto a screen (S74), and then terminates the processing operation.

Hereafter, the aforesaid processing operation is explained more specifically referring to FIG. 7 to FIG. 16.

Figure 7:
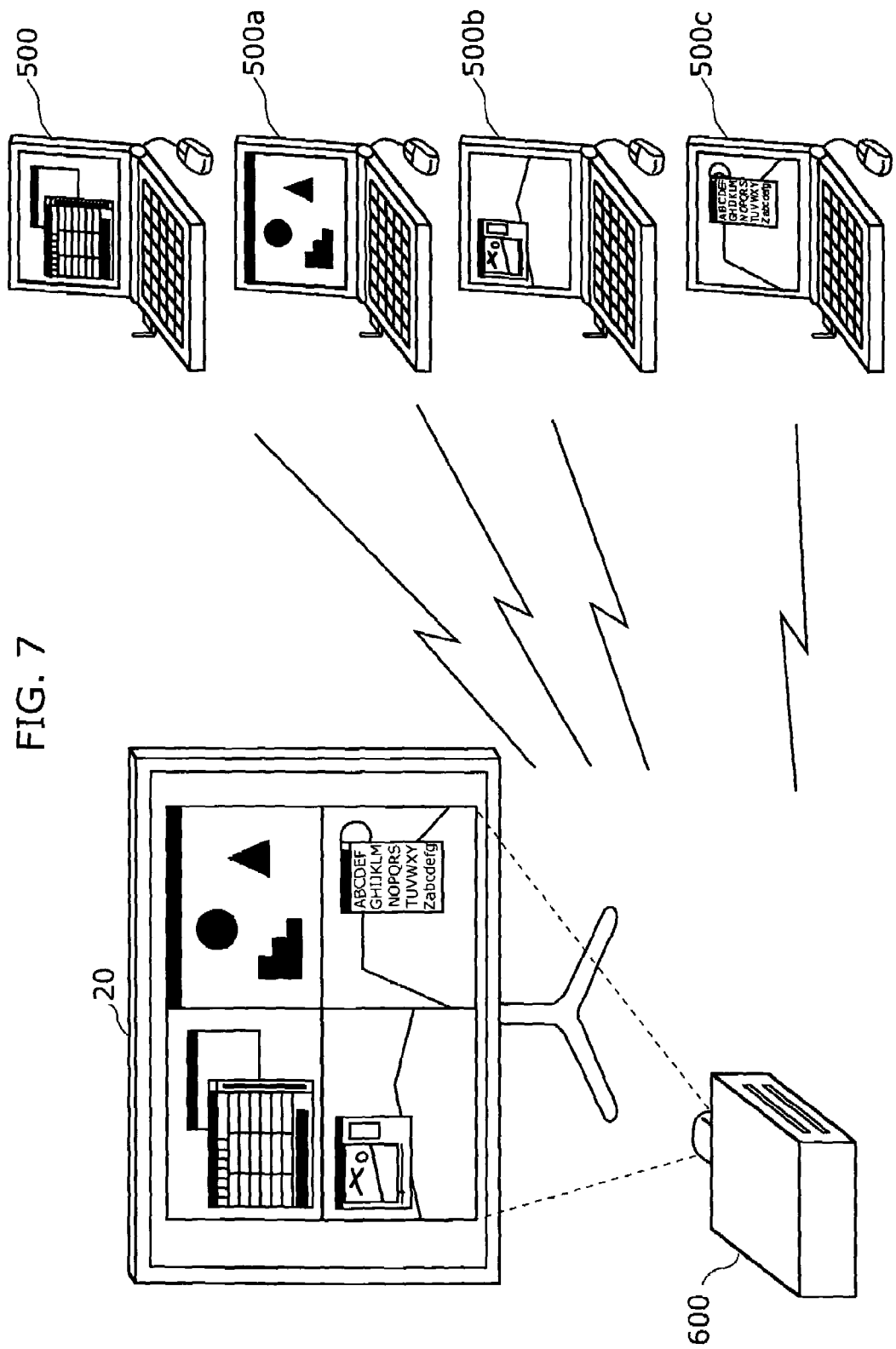
FIG. 7 is a diagram showing a situation that a plurality of PCs' display images are projected onto a screen of a projector.

FIG. 7 is a diagram showing a situation that a plurality of PCs' display images are projected onto a screen of a projector.

In FIG. 7, it is shown that four PCs' display images are respectively transmitted to one projector 600 from the four PCs, the PC 500, a PC 500a, a PC 500b and a PC 500c, and the projector 600 projects the received PCs' display images onto the screen 20 by dividing the display on the screen into four segments.

In this case, in the PC 500 the offset adjustment unit 511 performs a setting to display the transmission display image at ¼ size on the upper left-hand side of the projector 600, in the PC 500a the offset adjustment unit 511 performs a setting to display the transmission image at ¼ size on the upper right-hand side of the projector 600, in the PC 500b the offset adjustment unit 511 performs a setting to display the transmission image at ¼ size on the lower left-hand side of the projector 600, and then in the PC 500c the offset adjustment unit 511 performs a setting to display the transmission image at ¼ size on the lower right-hand side of the projector 600, and then the respective PC display images are transmitted from the respective PC communication unit 504 to the projector 600. In the projector 600, the offset judgment unit 611 judges the display position for the PC display images of the PC 500, PC500a, PC500b and the PC500c respectively, and then outputs the respective PC display images.

It should be noted that the specification of the display position receiving from the user may show only an approximate position like upper right-hand side, lower left-hand side and the like, and a detailed offset in the projector 600 may be calculated in the offset adjustment unit 511. Alternatively, the offset adjustment unit 511 may accept the specification only and directly transmit the specification to the projector 600, and then the offset judgment unit 611 may calculate the detailed offset.

Under this image display status, for example, in the case where the offset adjustment unit 511 performs setting to display the transmission display image using a full screen of the projector 600 in the PC 500. Subsequently, the offset judgment unit 611 judges the display position, and the PC display image is outputted to the display output unit 602 in the projector 600 as a full screen display.

FIG. 8 is a diagram showing a situation that a PC display image is projected onto a screen of a projector using the entire screen.

In FIG. 8, it is shown that the display image of the PC 500 is projected onto the screen 20 as a full screen display on the projector 600.

In this case, the communications between the projector 600 and each of the PC 500a, the PC 500b and the PC 500c are not established currently, so as to save the transmission band to be occupied by communications. In the case of FIG. 8, the communication lines between the projector 600 and each of the PC 500a, the PC 500b and the PC 500c are cut off. Here, it is assumed that the communication is cut off. However non-connectable information prohibiting transmission of the transmission images to each of the PC 500a to the PC 500c from the projector 600 may be transmitted at the time when the display is changed to a full screen display.

It should be noted that in this case an authorization which is able to exclude display authorizations of other users are set in the transmission display image in the user authorization setting unit 515 of the PC 500, and a full screen display is allowed based on the authorization setting in the user authorization judgment unit 615 of the projector 600.

Here, the user authorization is not limited to the setting in the user authorization setting unit 515. The user authorization judgment unit 615 may judge whether or not the display is allowed on the basis of the receiving order. In fact, in the case of the PC display image which needs a full screen display, the projector 600 may output the PC display image which the projector 600 received first, and not output the PC display image which the projector 600 received second until the display of the PC display image of full-screen is cancelled. In the case of divided-screen display (multi-display) as shown in FIG. 7, the PC display image may be outputted in an order of reception.

In addition, a specification of a display image by a user may be accepted through a remote controller of the projector 600, and the specified display image may be projected onto the screen 20 in full-screen, and also only the specified display image may be enlarged and then projected onto the screen.

FIG. 9 is a diagram showing a situation that an enlarged PC display image is projected onto a screen of a projector.

In FIG. 9 it is shown that PC display images are transmitted to one projector 600 from four PCs, i.e. the PC 500, the PC 500a, the PC 500b and the PC 500c respectively. The projector 600 receives the PC display images and then projects onto the screen 20 as thumbnail images. The display image of the PC 500 is enlarged to more than the size of the display images of the PC 500a, the PC 500b and the PC 500c in the projector 600, and is projected onto the screen 20.

In this case the PC display images to be projected as thumbnail images onto the screen 20 can be selected by a moving selection cursor 604a which is operated by the user using a remote controller 604, and the selected PC display image is enlarged to bigger than the other three PC display images. In FIG. 9 it is shown that the PC display image of the PC500 is selected and enlarged so as to be projected onto the screen 20. Here, the selection cursor 604a is currently positioned to the selected PC display image, and in the case where the user presses a selection determination button of the remote controller 604 again, the PC display image may be projected onto the screen 20 in full screen as shown in FIG. 8.

Here, the number of PC display images displayed onto the screen 20 as thumbnail images is four. However, the number of PC display images may be for example one, and it is obvious that the number of the PC display images is not limited to one.

In addition, images, for example an analog video signal and a digital video signal, inputted through interfaces other than a network, may be simultaneously projected onto the screen 20. Such images may be selectable by pointing with the selection cursor 604a using the remote controller 604.

It should be noted that the determination manner of a display authorization described here is only an example, and different manners like combination of receiving order, user authorization and the like can be used.

Under a display status shown in FIG. 8, in the case where the PC 500 transmits a directive signal for a cancellation of the full-screen display to the projector 600, or the communication between the PC 500 and the projector 600 is disconnected, the projector 600 projects the previous display image onto the screen 20 in the display output unit 602 again.

FIG. 10 is a diagram showing a situation that a display mode of the projector 600 is changed from a full-screen display to a multi-screen display.

In FIG. 10, it is shown that the communications between the projector 600 and each of the PC 500 to the PC 500c are disconnected, and the same display image as FIG. 7 is projected onto the screen 20.

In this case the projector 600 holds, in the VRAM 206, a PC display image of the PC 500 in multi-display before a full-screen display. At the time of a cancellation of full-screen display, the previous multi-display image is read out of the VRAM 206, and is projected onto the screen 20.

On the other hand, under a display status shown in FIG. 8, in the case where the PC 500 transmits a directive signal for a cancellation of the full-screen display to the projector 600, or the communication between the PC 500 and the projector 600 is disconnected, the projector 600 may re-start the communications with the PC 500a, the PC 500b and the PC 500c, and may re-receive the PC display images from the PC 500a, the PC 500b and the PC 500c.

FIG. 11 is a diagram showing a situation that the communications between the projector 600 and each of the PC 500a, the PC 500b and the PC 500c are re-established, so that the display is changed to a multi-display.

In FIG. 11 it is shown that the communication between the projector 600 and the PC 500 is disconnected, and the communications between the projector 600 and each of the PC 500a, the PC 500b and the 500c are re-established, and then the projector 600 receives the PC display images from the PC 500a, the PC 500b and the PC 500c respectively, and then projects the received PC display images on the screen 20. In addition a display position of a display image of the PC 500 in a previous multi-screen display is blacked out in the projector 600, and projects the display image. With regard to the blacked-out position, the drawing of an entirely blacked-out display image may be executed in the projector 600, and the blacked-out display image may be projected. Alternatively, at the time of sending a directive signal for a cancellation of the full-screen display to the projector, the drawing of an entirely blacked-out display image may be executed and transmitted to the projector 600 in advance, and then the projector 500 may project the received blacked-out display image.

It should be noted that, here, a case to transmit a plurality of display images of a plurality of PCs to a projector is explained, but a plurality of display images in one PC may be transmitted to one projector. This enables to display a plurality of documents onto one screen simultaneously, so that a presentation can be easily performed.

Figure 12:
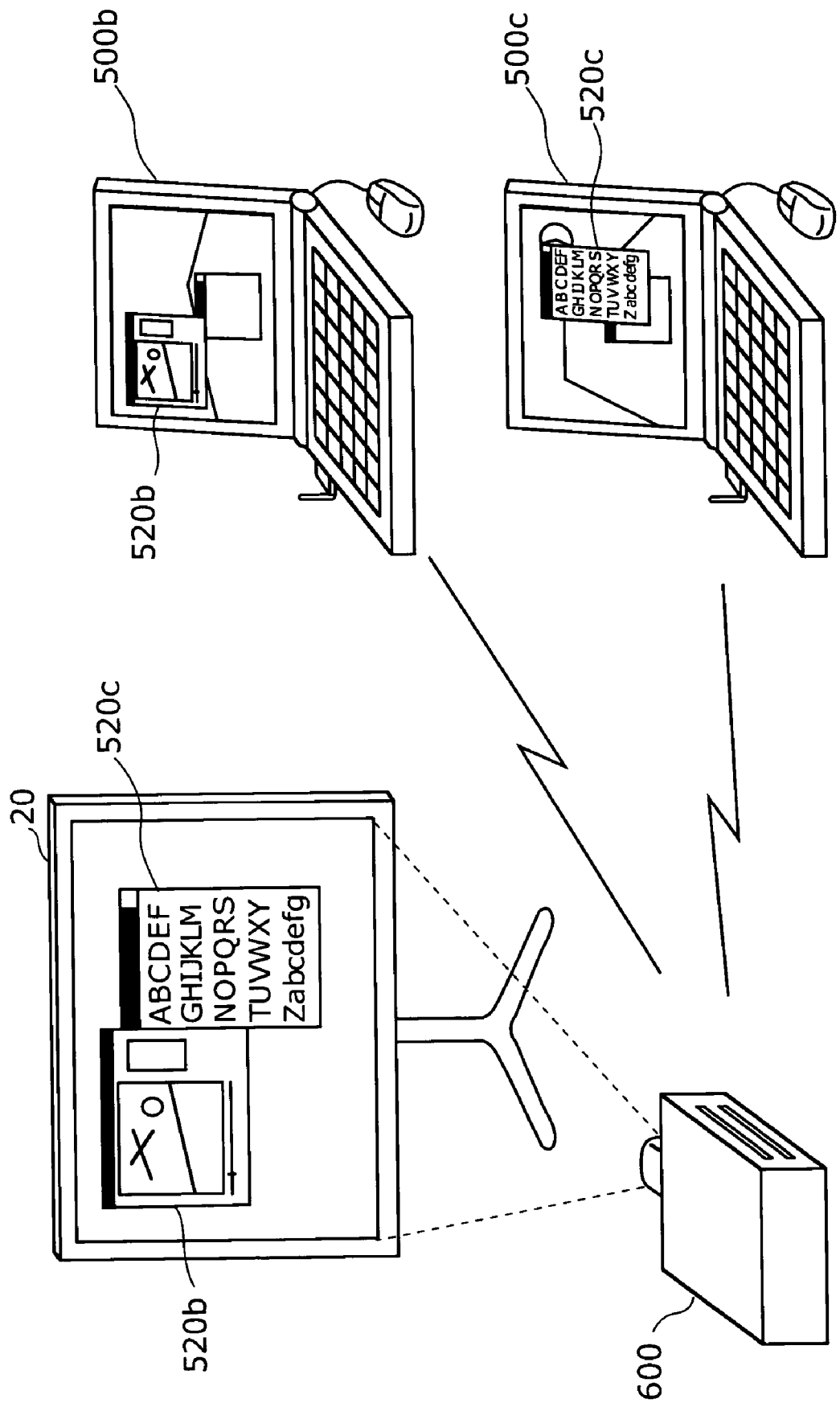
FIG. 12 is a diagram showing a situation that a display whose area to be projected is set on the PC side is projected onto a screen of a projector.

Next, a case that an area is determined for the display image to be transmitted in the PC side is explained. FIG. 12 is a diagram showing a situation that a display whose area to be projected is set on the PC side is projected onto a screen of a projector.

In FIG. 12 it is shown that a determined setting area 520b in the display of the PC 500b, and a determined setting area 520c in the display of the PC500c are transmitted to the projector 600 and are projected onto the screen 20.

The determined setting areas 520b and 520c in FIG. 12 are the windows located at a frontmost position with respect to all other windows in the displays. In this case, it is determined in the area adjustment units 513 of the PC 500b and the PC 500c that a window located at a frontmost position with respect to all other widows is the area to be transmitted.

Figure 13:
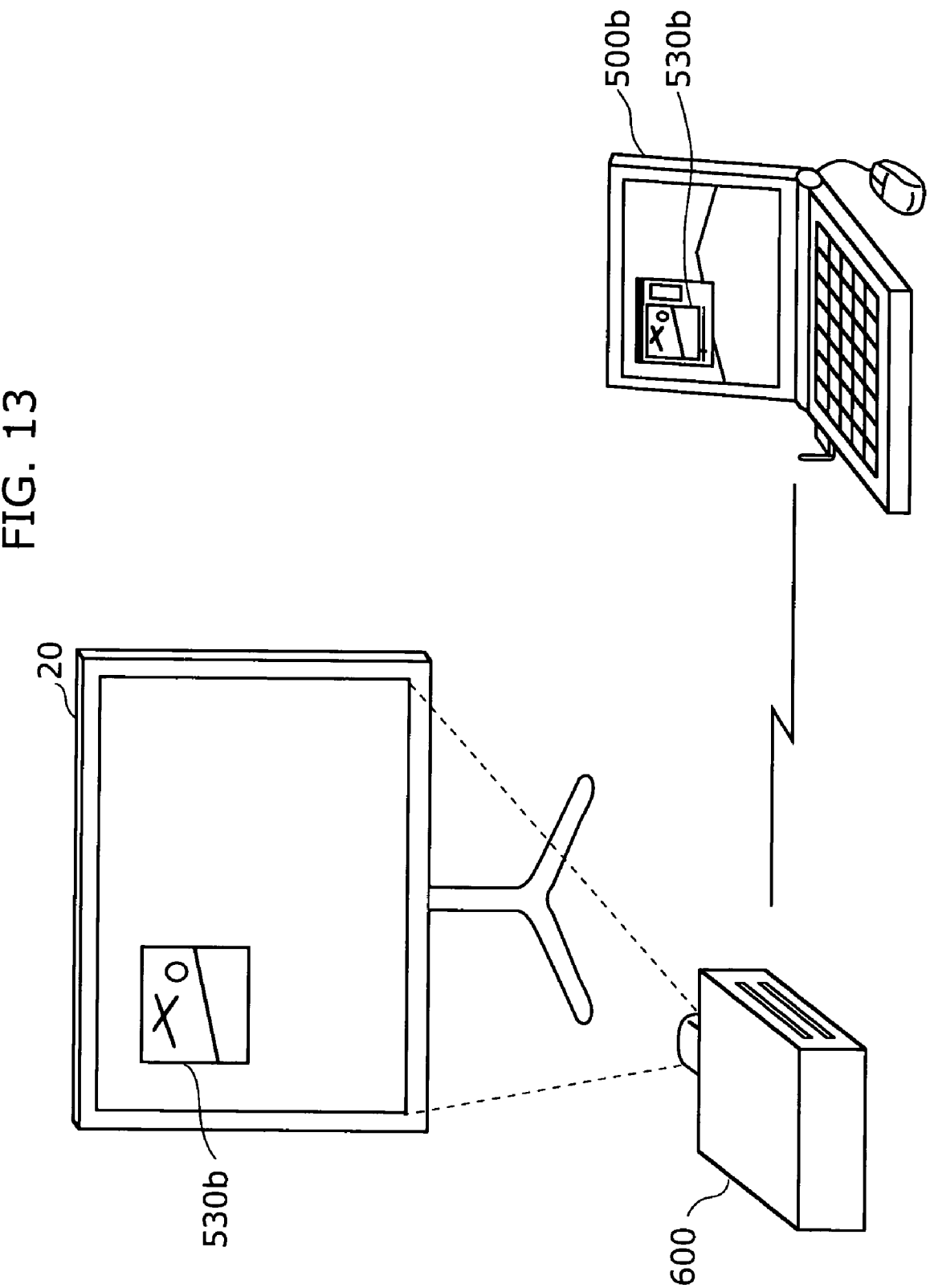
FIG. 13 is a diagram showing a situation that a display whose area to be projected is set by a user is projected onto a screen of a projector.

FIG. 13 is a diagram showing a situation that a display whose area to be projected is set by a user is projected onto a screen of a projector.

In FIG. 13 it is shown that a determined area 530b in the display of the PC 500b is transmitted to the projector 600, and is projected onto the screen 20.

The determined area 530b in FIG. 13 is an area determined by the user through the input unit 506. In this case, it is set in the area adjustment unit 513 of the PC 500b that the area determined by the user is the area to be transmitted.

Thus, the area, in the PC display image, to be transmitted can be adjusted, so that the convenience in sharing a screen area of the projector can be improved.

Incidentally, in the case where the projector receives a plurality of display images from a plurality of PCs and projects onto the screen, other users except the user of the PC from which the display image is transmitted are not able to identify the PC from which the display image is transmitted for the projection. Therefore, the source user name of a PC display image projected onto the screen may be indicated onto the screen in the projector side, so as to show, to each user, which PC display image is currently projected.

Figure 14:
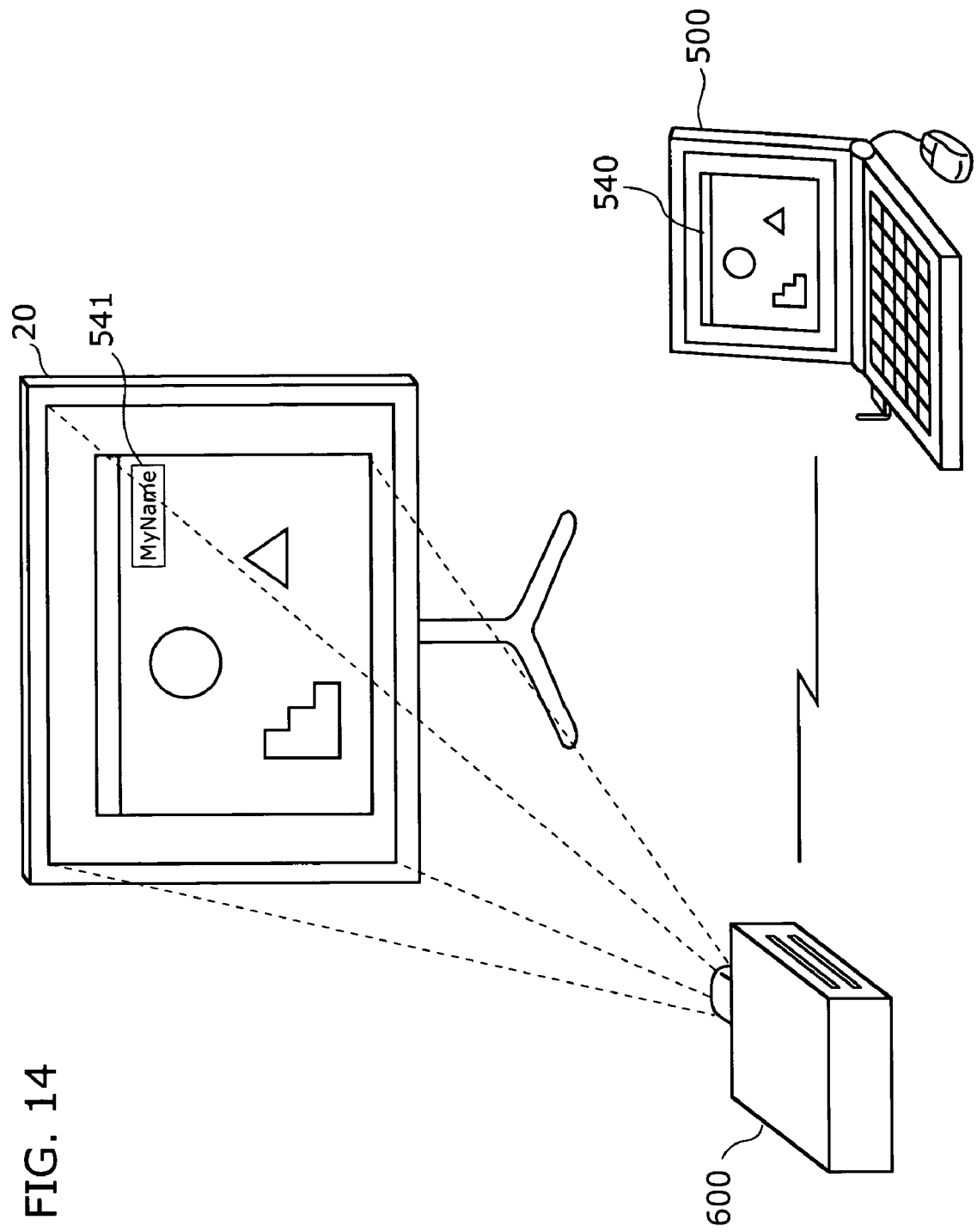
FIG. 14 is a diagram showing a situation that a display image including a user name is projected onto a screen of a projector.
Figure 15B:
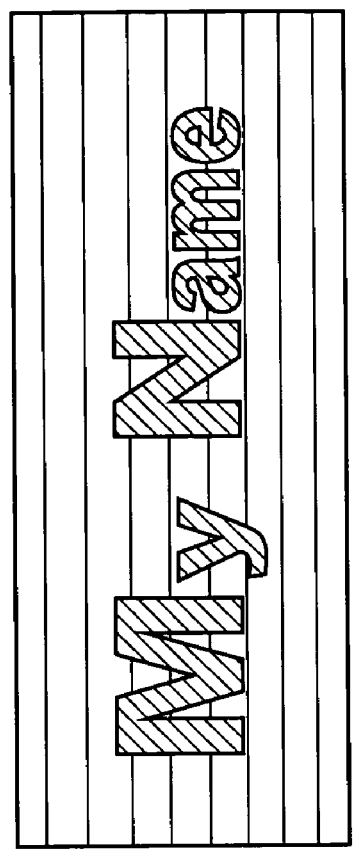
FIG. 15B is another example of the display pattern of a user name.
Figure 15A:
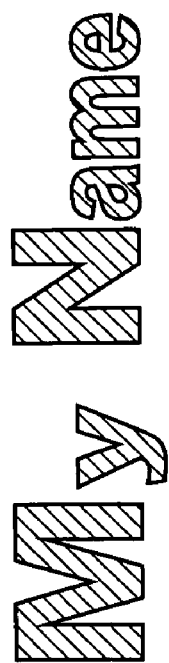
FIG. 15A is a diagram showing an example of a display pattern of a user name.

FIG. 14 is a diagram showing a situation that a display image including a user name is projected onto the screen of the projector.

In FIG. 14 it is shown that the PC 500 transmits a PC display image 540 to the projector 600, and then the projector 600 projects the display image onto the screen 20. The projector 600 projects a user name indication 541 which is not included in the PC display image 540 onto the screen 20. At this time, the PC 500 transmits an identifier (for example, computer name) of the PC 500 to the projector 600 along with the PC display image 540, and the projector 600 generates a layer on which a user name is described based on the received identifier. Accordingly, the projector 600 projects the user name indication 541, which is not displayed on the PC display image 540, onto the screen 20. It should be noted that it is assumed that a layer, on which a user name is described, is generated in the projector 600 side here. However, a virtual layer, on which a user name is described, may be generated in the PC 500 side, the generated virtual layer may be transmitted to the projector 600, and then the transmitted layer may be projected onto the screen 20. It should be noted that the virtual layer here is not a layer like an actual layer but is regarded as a non-display in the PC 500 side. The layer is a layer virtually generated so as to be projected onto the screen 20 in the projector 600 side.

In this case, it is preferable that the projector 600 and the PC 500 perform processing to raise the visibility of the projection at the time of generating a layer on which a user name is generated for the projector 600 and at the time of generating a virtual layer on which a user name is described. Hereafter the description is shown referring to FIG. 15. According to the example in FIG. 15A, the characters of the user name in the projector 600 and the PC 500 are edged in order to emphasize the characters, so that the visibility at the time of the projection is raised. In addition, according to the example in FIG. 15B, the characters of the user name are edged, and a different background color is used for the layer. Thus, the characters' part is emphasized irrespective of the background color of the display image projected onto the screen 20, so that the visibility at the time of the projection is raised.

It should be noted that the above description shows a case of indicating the user name, but the information to be indicated is actually not limited to the user name. For example, information such as date, time and the like may be projected onto the screen 20.

Next, adjustment processing of a resolution is explained.

Figure 16:
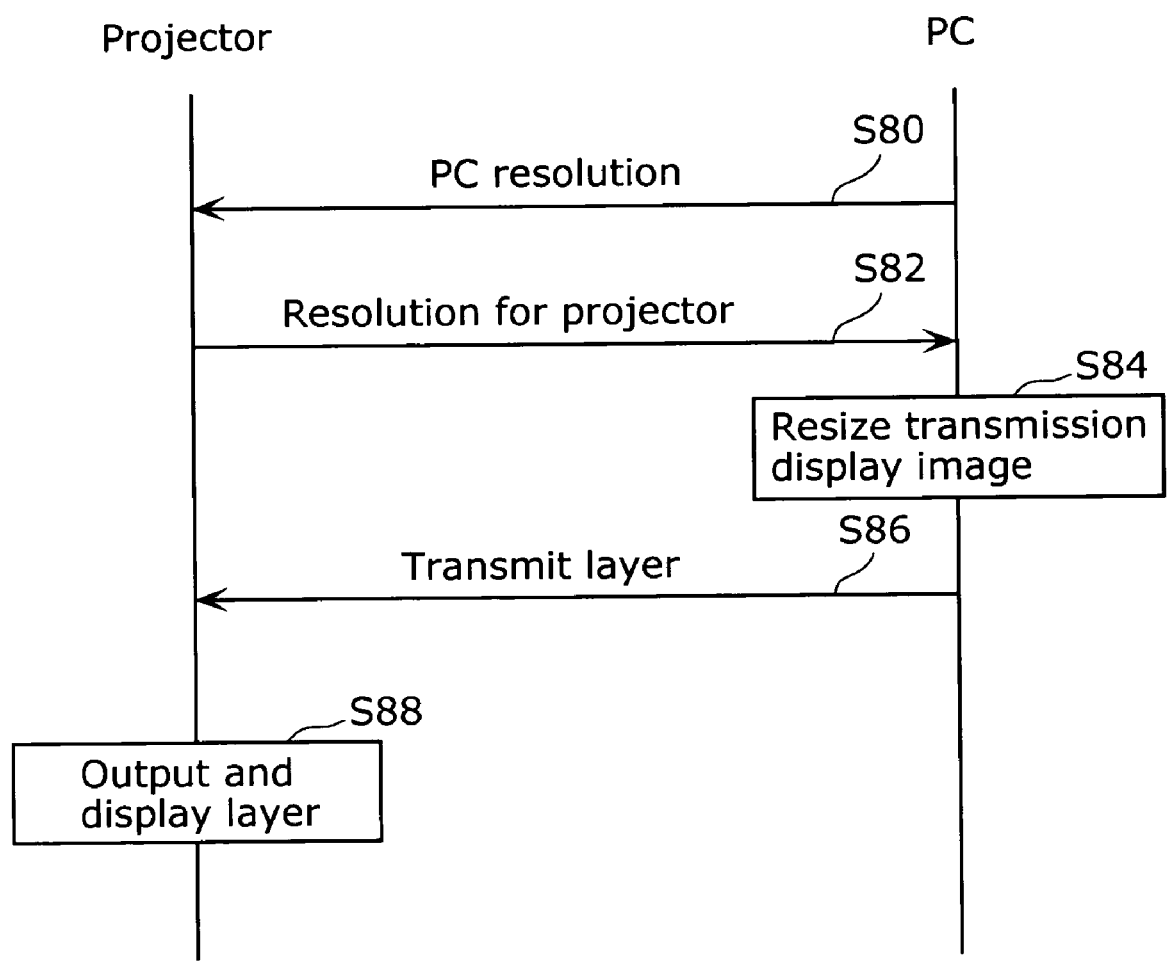
FIG. 16 is a communication sequence diagram between a PC and a projector for a case of a resolution adjustment.

FIG. 16 is a communication sequence diagram between a PC and a projector for the case of a resolution adjustment.

Firstly, the PC 500 transmits the resolution of the PC display image to the projector 600 through the PC communication unit 504 (S80), and requests an obtainment of the full resolution (a resolution for projector) that the projector 600 can support. The projector 600 receives the PC resolution, and transmits the resolution for the projector through the projector communication unit 601 to the PC 500 (S82).

The PC 500 obtains the resolution for the projector, and the resolution adjustment unit 512 resizes the resolution of a transmission display image so as to be within the resolution for the projector (S84), and then transmits the resized layer to the projector 600 through the PC communication unit 504 (S86).

For example, in the case where the resolution of the PC display image to be transmitted is SXGA (1280*1024 dots) and the resolution for the projector is XGA (1024*768 dots), the resolution adjustment unit 512 in the PC 500 resizes the transmission display image to XGA and outputs the resized display image to the PC communication unit 504. In the case where the resolution of the PC display image to be transmitted is VGA (640*480 dots) and the resolution for the projector is XGA, since the resolution of the display image to be transmitted is within the resolution for the projector, the resolution adjustment unit 512 outputs the display image to the PC communication unit 504 without resizing the transmission display image.

Afterwards, the projector 600 outputs and displays the received layer (S88), and terminates the processing operation.

Further, in the case where the resolution of the PC display image is lower than the resolution for the projector, the resolution judgment unit 612 in the projector 600 resizes the resolution of the received PC display image from VGA to XGA, and outputs the resized display image to the display output unit 602.

It should be noted that in the case where the resolution of the PC display image is changed while a display image is transmitted from the PC 500 to the projector 600 and the transmitted display image is projected onto the screen 20 in the projector 600 side, the resolution adjustment unit 512 in the PC 500 detects the change of the resolution and performs adjustment on the resolution again, and the PC display image with the adjusted resolution is retransmitted, so as to be able to correspond to the change of resolution of the PC display image in the projector 600 side. In addition, a screensaver and the like are the possible applications which affect the resolution of PC display image.

However, in the case where the resolution adjustment unit 512 is connected with the projector 600, such applications may be nullified in the user setting or in the default setting.

Next, a display correction processing is explained.

Figure 17:
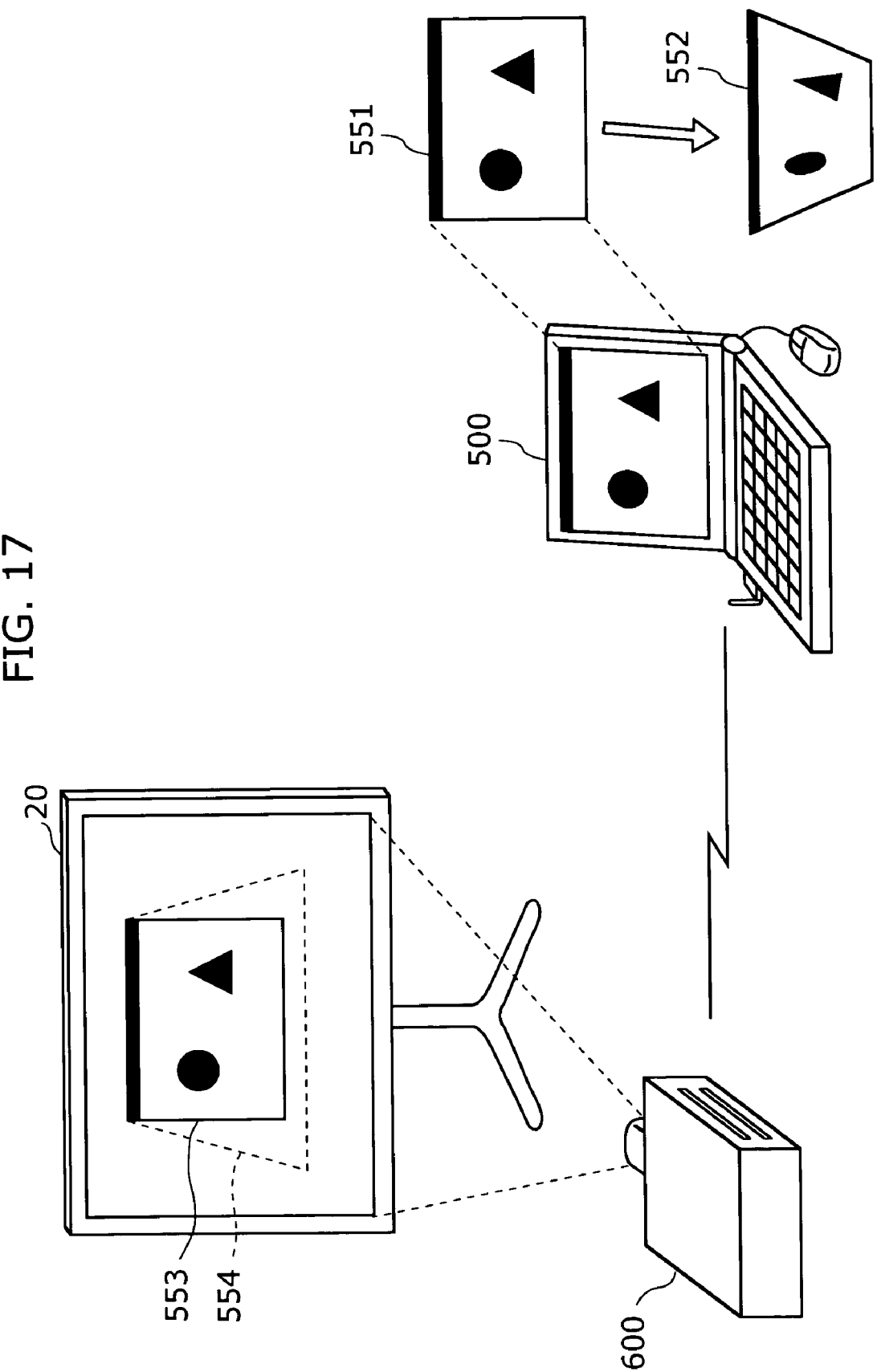
FIG. 17 is a diagram showing a situation that a display image is corrected in the PC, and the corrected display image is projected onto a screen of a projector.

FIG. 17 is a diagram showing a situation that a display image is corrected in the PC, and the corrected display image is projected onto the screen of the projector.

In FIG. 17 it is shown that in the case where the PC 500 transmits a PC display image 551 directly before a correction to the projector 600, a pre-correction display image 554 is projected onto the screen 20, and also in the case where the PC 500 performs a keystone correction on the PC display image 551 and transmits a display image after correction 552 to the projector 600, a received display image after correction 553 is projected onto the screen 20.

At this time, the correction judgment unit 616 in the projector 600 generates a display prediction information, which shows that the pre-correction display image 554 is projected, using an angle sensor and the like installed in the projector 600, and then transmits the display prediction information through the projector communication unit 601 to the PC 500. The display image correction unit in the PC 500 performs a keystone correction on the PC display 551 based on the obtained display prediction information so as to generate the display image after correction 553, and then transmits the display image after correction 553 to the projector 600 through the PC communication unit 504. Thus, the PC 500 obtains display prediction information from the projector 600, performs a correction on the display image, and transmits the corrected display image to the projector 600, so that it is possible to reduce the processing for adjusting the projection condition of the display image at the projector 600.

Next, a transformed example of the image transmission system for the present embodiment is explained.

Figure 18:
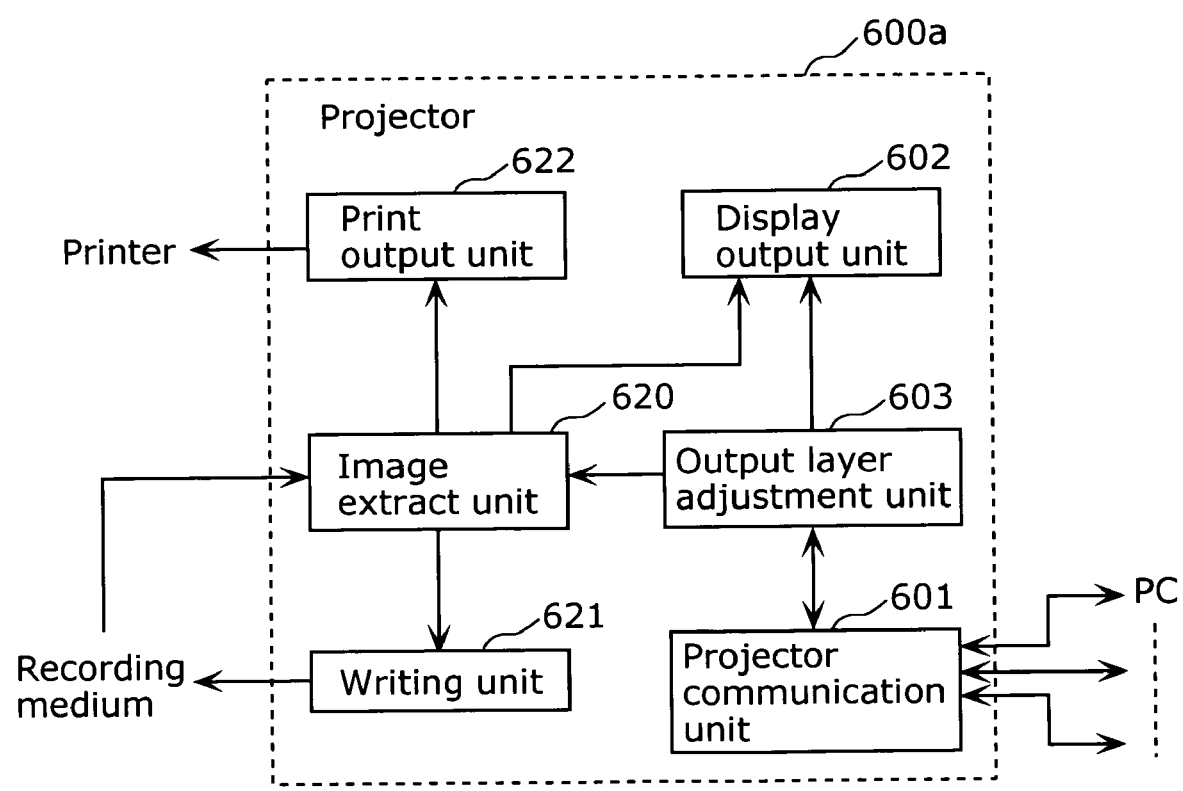
FIG. 18 is a block diagram showing a functional configuration of a projector in a first transformed example.

FIG. 18 is a block diagram showing a functional configuration of a projector in the first transformed example.

The projected display image is not able to be saved or be printed out by a conventional projector. Therefore, a step to operate PC is needed in the case where the projected display image data is saved in a recording medium and the projected display image is printed out.

A projector 600a in the first transformed example enables to skip such a step, and to implement a smooth presentation.

As shown in FIG. 18, the projector 600a in the first transformed example includes an image extract unit 620, a writing unit 621 and a print output unit 622 in addition to the configuration of the projector 600.

The Image extract unit 620 is a processing unit to extract an image of a display image to be projected onto the screen 20 out of the output layer adjustment unit 603.

The writing unit 621 is a processing unit to write the display image, which has been extracted by the image extract unit 620, in a recording medium such as a memory card.

The print output unit 622 is a processing unit to output the display image, which has been extracted by the image extract unit 620, to a printer.

Such a configuration enables the projector 600a to save the display image into a recording medium and to print out the screen image. It should be noted that the image extract unit 620 may read the display image out of the recording medium, and may output to the display output unit 602.

Figure 19:
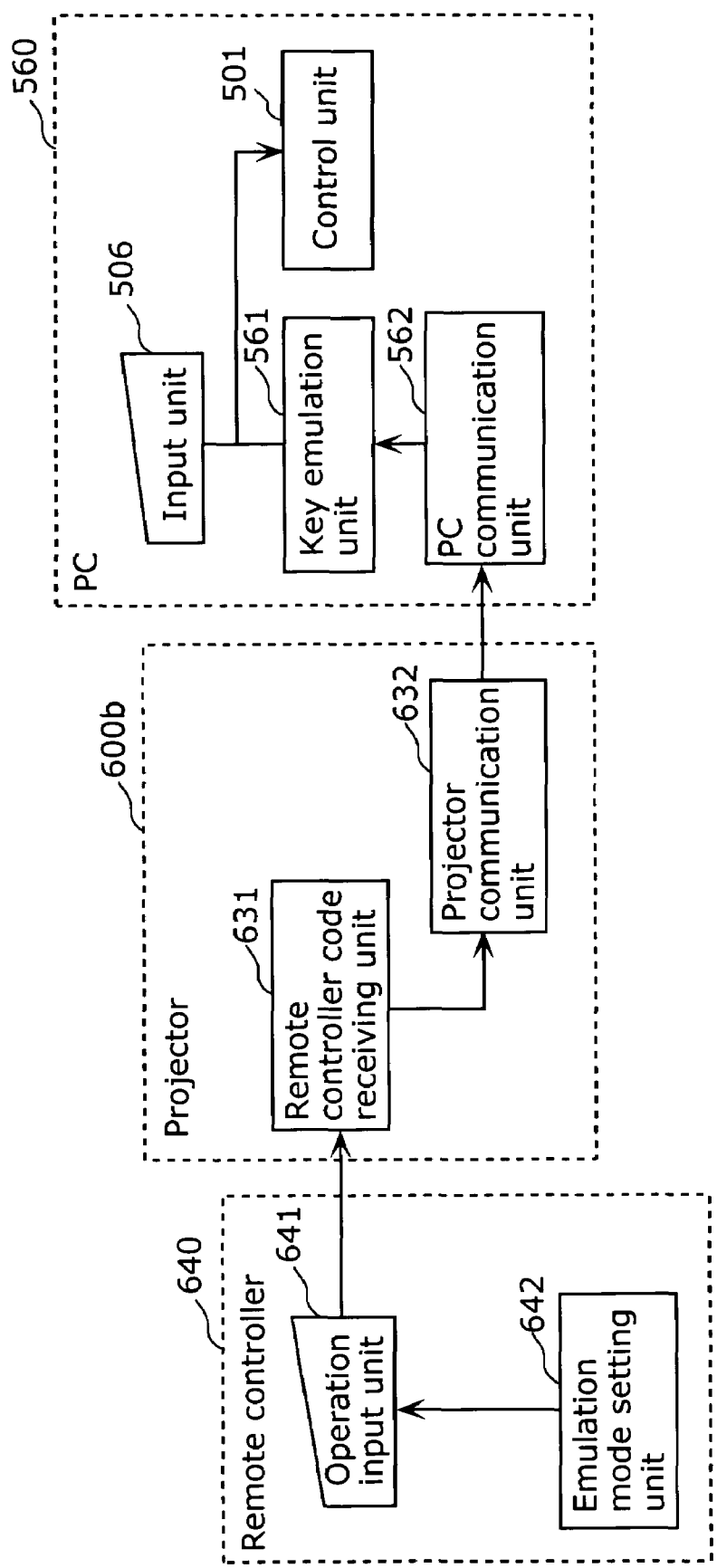
FIG. 19 is a block diagram showing a functional configuration of a PC, a projector and a remote controller in a second transformed example.

FIG. 19 is a block diagram showing a functional configuration of a PC, a projector and a remote controller in a second transformed example.

At the time of a presentation, a user needs to step away from the PC to explain a projected display image. In this case, the user needs to return to the PC to change the display image to be projected and to move the cursor, so that the presentation is suspended for such operations. The image transmission system of the second transformed example enables to solve such inconvenience.

As shown in FIG. 19, a PC 560 in the second transformed example includes the control unit 501, the input unit 506, a key emulation unit 561 and a PC communication unit 562, and a projector 600b includes a remote controller code receiving unit 631 and a projector communication unit 632, and a remote controller 640 includes an operation input unit 641 and an emulation mode setting unit 642.

The remote controller 640 is a remote controller for adjusting a display (for example, adjustments of contrasting and size) of the projector 600b, and includes the operation input unit 641 and the emulation mode setting unit 642.

The operation input unit 641 is a button and the like to accept a user operation, and outputs the inputted signal to the projector 600b.

The emulation mode setting unit 642 is a processing unit to perform a key emulation of an input signal of the operation input unit 641. Here, the key emulation means that the operation by the operation input unit 641 emulates an operation of the input device of the PC 560. For example, in the emulation mode setting unit 642, a mode for a key emulation is assigned to a fixed button of the remote controller 640, and the mode is activated when the button pressing operation is accepted.

The remote controller code receiving unit 631 is a processing unit to obtain an input signal from the remote controller

640, and judges whether an input signal is a normal mode (a mode to operate as a remote controller of a projector) or a key emulation mode. In the case where the input signal is a key emulation mode, the input signal is outputted to the projector communication unit 632.

The projector communication unit 632 transmits the input signal of a key emulation mode to the PC communication unit 562, and the PC communication unit 562 outputs the received input signal to the key emulation unit 561.

The key emulation unit 561 is a processing unit to convert an input signal obtained from the PC communication unit 562 into an input signal from the input unit 506.

Such a configuration enables to operate a PC by a remote controller of a projector, and the page forward/backward function for the presentation document in the PC can be executed apart.

According to the image transmission system for the present embodiment, a display position, an area to be transmitted and the like are adjusted and transmitted from a PC to a projector, so that a user is able to choose a full screen display, a display divided into two segments or four segments and the like for the PC display image to be projected, and thus a various types of presentation can be implemented.

In addition, a PC display image is captured and transmitted to a projector on a layer basis, and also layers which do not need to be projected are chosen in the PC side, so that the amount of the transmission can be reduced, and a traffic in a transmission path between a PC and a projector can be reduced. Furthermore, the resolution of the transmission display image can be adjusted in accordance with the resolution of the projector, and be transmitted, so that the traffic in the transmission path can be reduced.

Furthermore, in the case where a display image is transmitted from a PC to a projector, the compression ratio and the compression technique of the display image are adjusted and then transmitted, so that it is possible to transmit the display image in accordance with the user settings such as picture quality priority and transmission speed priority.

The image transmission system for the present invention was explained based on the embodiment, however the present invention is not limited to these embodiment.

For example, in the above embodiment, the communication between a PC and a projector is done by a wireless LAN, but it is obvious that the communication can be performed using a wired LAN and a USB (Universal Serial Bus), and also be executed based on Institute of Electrical and Electronic Engineers (IEEE) 1394 and the like.

In addition, a projector is used as an image projecting system in the embodiment, but display devices such as a plasma display panel and the like may be used.

The image transmission system of the present invention is applicable to a system for transmitting an image from a PC and the like as an image generating apparatus to a projector and the like as an image projecting apparatus. Particularly the image transmission system is suitable for a presentation and the like using a wireless projector.

The invention claimed is:

1. An image transmission system comprising:
a plurality of image generating apparatuses, each of which is operable to generate an image; and
an image projecting apparatus operable to project the plurality of images transmitted from said image generating apparatus through a multimode, in which the plurality of images are simultaneously projected onto a projection screen divided into a plurality of segments,
wherein each image generating apparatus includes:
an image generating unit operable to generate an image;
a transmission image adjustment unit operable to perform image adjustment on one of an image transmission and an image projection by said image projecting apparatus; and
a transmission unit operable to transmit the adjusted image to said image projecting apparatus, and
said image projecting apparatus includes:
a receiving unit operable to receive the image transmitted from said image generating apparatus;
an output image adjustment unit operable to judge a content of the adjustment performed on the received image, and then to perform readjustment on the image based on the judgment; and
a projecting unit operable to project the readjusted image,
said transmission image adjustment unit is operable to perform image adjustment that corresponds to one of the multimode and a full-screen mode for projecting an image onto an entire area of the projection screen of said image projecting apparatus, and
said output image adjustment unit is operable to specify a mode of the projected images, to perform readjustment by prioritizing the images on which readjustment is performed currently, not to perform readjustment on the images in other image generating apparatuses received later by said receiving unit, in the case where the current readjustment being performed corresponds to the full-screen mode, and to perform readjustment by prioritizing the images in the other image generating apparatuses received later by said receiving unit, in the case where the current readjustment being performed corresponds to the multimode.

2. The image transmission system according to claim 1, wherein said output image adjustment unit is operable to change from the multimode to the full-screen mode, and then to perform readjustment on the image, in the case where an image readjusted in the multimode is changed from a status in which the adjustment corresponding to the multimode is performed to a status in which the adjustment corresponding to the full-screen mode is performed.

3. The image transmission system according to claim 1, wherein said output image adjustment unit is operable to change from the full-screen mode to the multimode, and then to perform readjustment on the image, in the case where the image readjusted in the full-screen mode is changed from a status in which the adjustment corresponding to the full-screen mode is performed to a status in which the adjustment corresponding to the multimode is performed.

4. The image transmission system according to claim 1, wherein said output image adjustment unit is operable to perform readjustment on the received image using an index mode for projecting simultaneously the plurality of images onto the projection screen by dividing the projection screen into a main area and a plurality of sub-areas.

5. The image transmission system according to claim 4, wherein said image projecting apparatus further includes:
a selection acceptance unit operable to accept a selection of an image out of the plurality of images respectively projected onto the plurality of sub-areas, and
said output image adjustment unit is operable to perform readjustment the selected image, and then to project the selected image onto the main area.

6. The image transmission system according to claim 1, wherein said image generating apparatus further includes:

a separation unit operable to separate layers composing the image into layer to be transmitted to said image projecting apparatus and layer not to be transmitted, wherein said transmission image adjustment unit is operable to perform image adjustment on the separated layer to be transmitted for one of a layer transmission and a projection by said image projecting apparatus, said transmission unit is operable to transmit the adjusted layers to said image projecting apparatus, said receiving unit is operable to receive the layer transmitted from said image generating apparatus, said output image adjustment unit is operable to judge the content of the adjustment performed on the received layer, and then to perform readjustment on the layers based on the judgment, and said projecting unit is operable to project the readjusted layers.

7. The image transmission system according to claim 1, wherein said transmission image adjustment unit is operable to add information, to the image, which specify a position on the projection screen of said image projecting apparatus, and said output image adjustment unit is operable to judge the specified position, and to place the image on the position on the projection screen.

8. The image transmission system according to claim 7, wherein said transmission image adjustment unit is operable to perform image adjustment on the image so as to fit to the size on the projection screen of said image projecting apparatus.

9. The image transmission system according to claim 1, wherein said transmission image adjustment unit is operable to perform an adjustment of a resolution for the image.

10. The image transmission system according to claim 9, wherein said transmission image adjustment unit is operable to obtain beforehand information on a resolution that said image projecting apparatus is able to support, and to perform adjustment on the resolution of the image based on the resolution information.

11. The image transmission system according to claim 9, wherein said output image adjustment unit is operable to perform readjustment on the resolution of the received image, in the case where the resolution adjusted by said transmission image adjustment unit does not match the resolution that said image projecting apparatus is able to support.

12. The image transmission system according to claim 1, wherein said transmission image adjustment unit is operable to set an area, in the image, to be transmitted to said image projecting apparatus.

13. The image transmission system according to claim 12, wherein said transmission image adjustment unit is operable to set a layer, as the area, which is located at a frontmost position in the display of said image generating apparatus out of the layers composing the image.

14. The image transmission system according to claim 12, wherein said transmission image adjustment unit is operable to set an area, as the area, specified by a user in the image.

15. The image transmission system according to claim 1, wherein said transmission image adjustment unit is operable to perform image adjustment on a compression degree of the image, to compress the image and to add information related to the compression to the compressed image, and said output image adjustment unit is operable to judge the information related to the compression and to decompress the received image.

16. The image transmission system according to claim 1, wherein said transmission image adjustment unit is operable to set an authorization related to an occupancy on the projection screen of said image projecting apparatus, and to add the information related to the authorization to the image, and said output image adjustment unit is operable to judge whether or not the received image is allowed to be projected based on the information related to the authorization.

17. The image transmission system according to claim 1, wherein said transmission image adjustment unit is operable to predict a display image to be projected on said image projecting apparatus, and to correct the image based on the prediction.

18. The image transmission system according to claim 1 further comprising a remote controller operable to operate said image projecting apparatus, said remote controller includes:

an operation input unit operable to accept an operation of said image projecting apparatus by a user; and an emulation mode setting unit operable to virtually set an input by said operation input unit to an input mode by an input unit of said image generating apparatus, and said image projecting apparatus includes:

a remote controller code receiving unit operable to obtain an operation signal inputted in said operation input unit; and a signal transmission unit operable to transmit the obtained operation signal to said image generating apparatus, said image generating apparatus includes:

a signal receiving unit operable to receive the operation signal; and a key emulation unit operable to convert the received operation signal into an input by the input unit of said image generating apparatus.

19. An image transmission method for transmitting a plurality of images from a plurality of image generating apparatuses, each of which generates an image, to an image projecting apparatus which projects the images through a multimode, in which the plurality of images are simultaneously projected onto a projection screen divided into a plurality of segments, the method comprising the following steps executed by the image generating apparatus:

an image generating step of generating an image;

a transmission image adjustment step of performing adjustment on the image related to an image transmission and an image projection by the image projecting apparatus; and a transmission step of transmitting the adjusted image to the image projecting apparatus, and the method comprising the following steps executed by the image projecting apparatus:

a receiving step of receiving the image transmitted from the image generating apparatus;

an output image adjustment step of judging a content of the adjustment performed on the received image, and performing readjustment on the image based on the judgment; and a projecting step of projecting the readjusted image, wherein, in the transmission image adjustment step, image adjustment is performed, the image adjustment corresponding to one of the multimode and a full-screen mode for projecting an image onto an entire area of the projection screen of the image projecting apparatus, and in the output image adjustment step, a mode of the projected images is specified, readjustment is performed by prioritizing the images on which readjustment is performed currently, readjustment is not performed on the images in other image generating apparatus received later in the receiving step, in the case where the current readjustment being performed corresponds to the full-screen mode, and readjustment is performed by prioritizing the images in the other image generating apparatuses received later by the receiving step, in the case where the current readjustment being performed corresponds to the multimode.

20. An image projecting apparatus in an image transmission system which includes a plurality of image generating apparatuses, each of which generates an image, and an image projecting apparatus which projects the plurality of images transmitted from said image generating apparatus through a multimode, in which the plurality of images are simultaneously projected onto a projection screen divided into a plurality of segments, said image projecting apparatus comprising:

a receiving unit operable to receive the image transmitted from said image generating apparatus;

an output image adjustment unit operable to judge a content of the adjustment performed on the received image, and then to perform readjustment on the image based on the judgment; and a projecting unit operable to project the readjusted image, wherein said output image adjustment unit is operable to specify a mode of the projected images, to perform readjustment by prioritizing the images on which readjustment is performed currently, and not to perform readjustment on the images in other image generating apparatuses received later by said receiving unit, in the case where the current readjustment being performed corresponds to a full-screen mode for projecting an image onto an entire area of the projection screen of said image projecting apparatus and to perform readjustment by prioritizing the images in the other image generating apparatuses received later by said receiving unit, in the case where the current readjustment being performed corresponds to the multimode.

21. A computer-readable storage medium which stores a program for an image projecting apparatus in an image transmission system which includes a plurality of image generating apparatuses, each of which generates an image, and an image projecting apparatus which projects the plurality of images transmitted from said image generating apparatus through a multimode, in which the plurality of images are simultaneously projected onto a projection screen divided into a plurality of segments, wherein the program causes a computer to execute:

a receiving step of receiving the image transmitted from said image generating apparatus;

an output image adjustment step of judging a content of the adjustment performed on the received image, and then to perform readjustment on the image based on the judgment; and a projecting step of projecting the readjusted image, wherein, in said output image adjustment step, a mode of the projected images is specified, readjustment is performed by prioritizing the images on which readjustment is performed currently, readjustment is not performed on the images in other image generating apparatuses received later in the receiving step, in the case where the current readjustment being performed corresponds to a full-screen mode for projecting an image onto an entire area of the projection screen of the image projecting apparatuses, and readjustment is performed by prioritizing the images in the other image generating apparatuses received later by the receiving step, in the case where the current, readjustment being performed corresponds to the multimode.

* * * * *